E. C. WALTER.
CALCULATING MACHINE.
APPLICATION FILED JULY 6, 1911.
1,224,872.
Patented May 1, 1917.
10 SHEETS—SHEET 1.
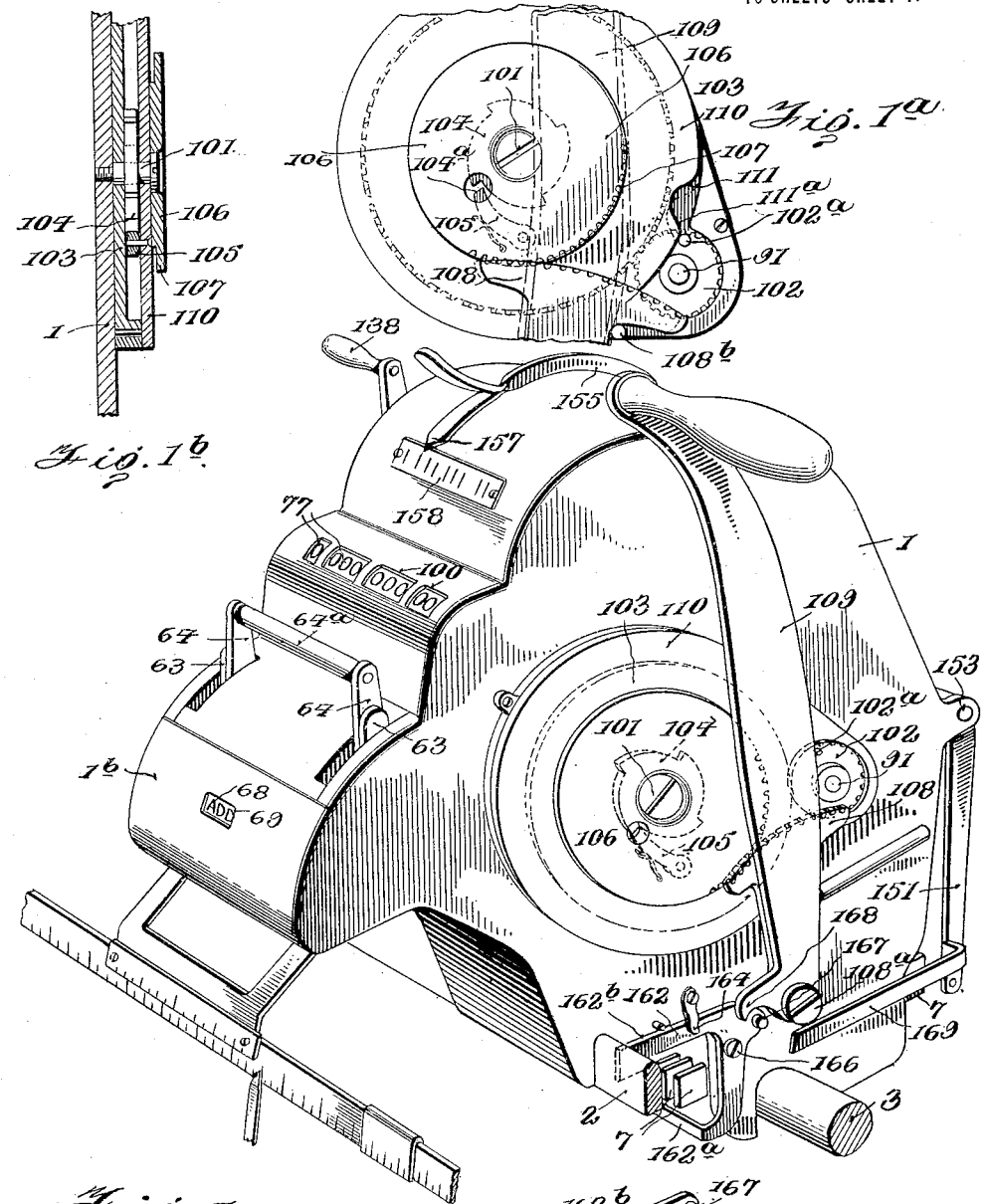
Fig. 1b.
Fig. 1.
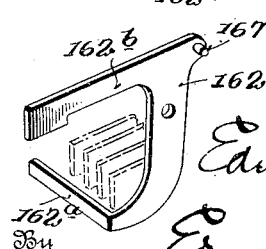
Fig. 1c.
Witnesses
Helz H Munay
James Atkins
Inventor
Edward C. Walter,
By
Edmund H. Parry
Attorney E. C. WALTER.
CALCULATING MACHINE.
APPLICATION FILED JULY 6, 1911.
1,224,872.
Patented May 1, 1917.
10 SHEETS—SHEET 2.
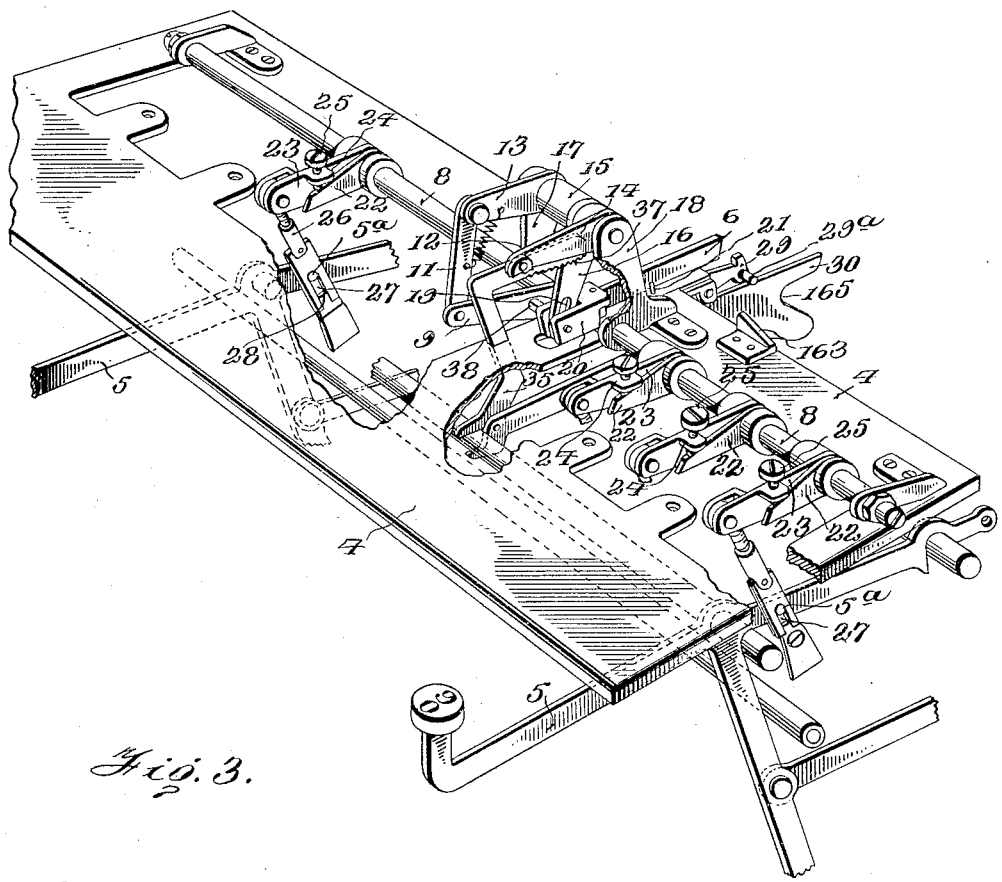
Fig. 2.
Fig. 3.
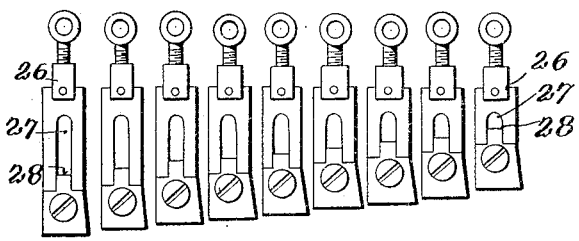
Witnesses
Inventor
Edward C. Walter,
By Edmund H. Parry
Attorney

E. C. WALTER.
CALCULATING MACHINE.
APPLICATION FILED JULY 6, 1911.

1,224,872.

Patented May 1, 1917.
10 SHEETS—SHEET 8.

Witnesses
Inventor
Edward C. Walter,
By Edmund H. Parry
Attorney

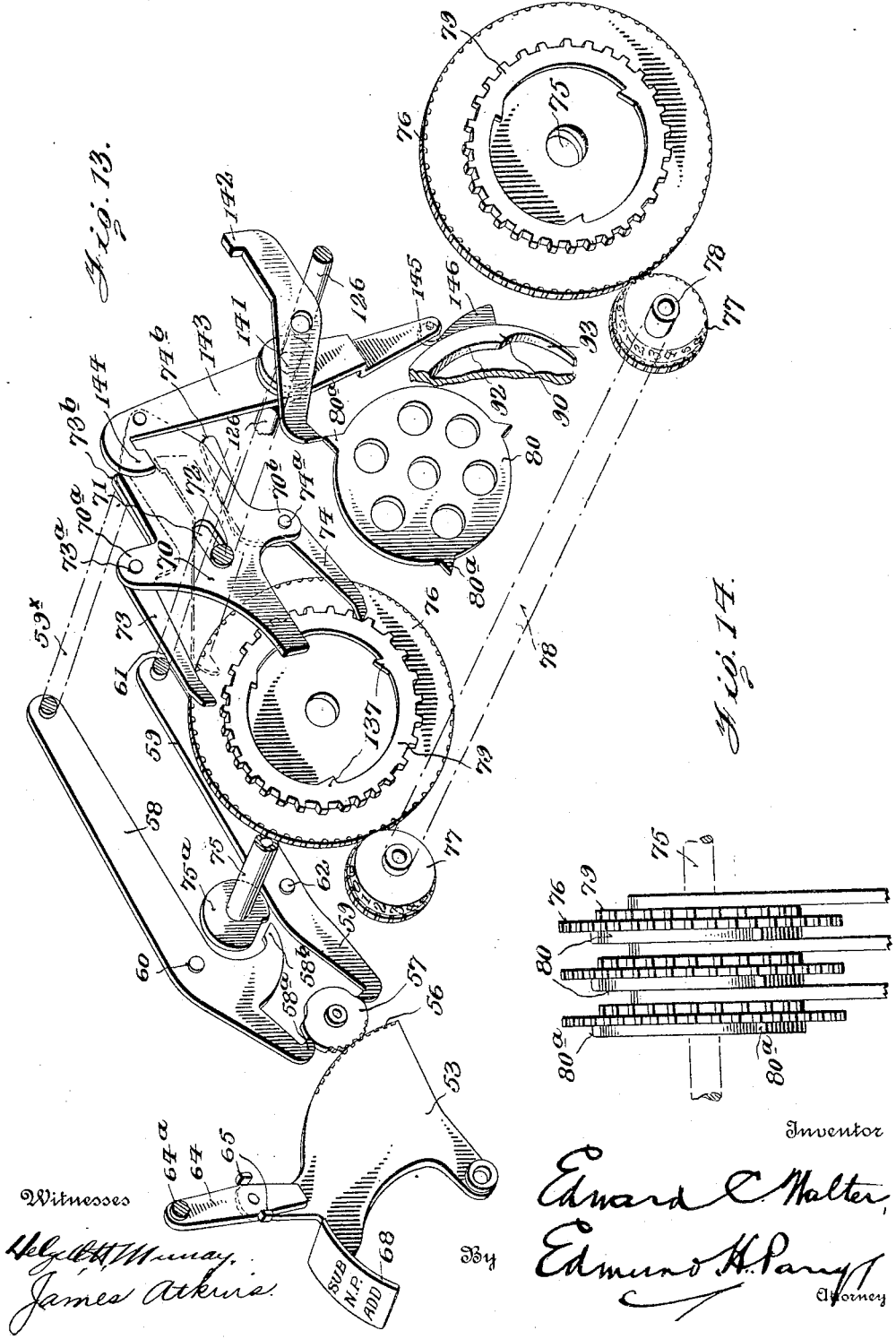

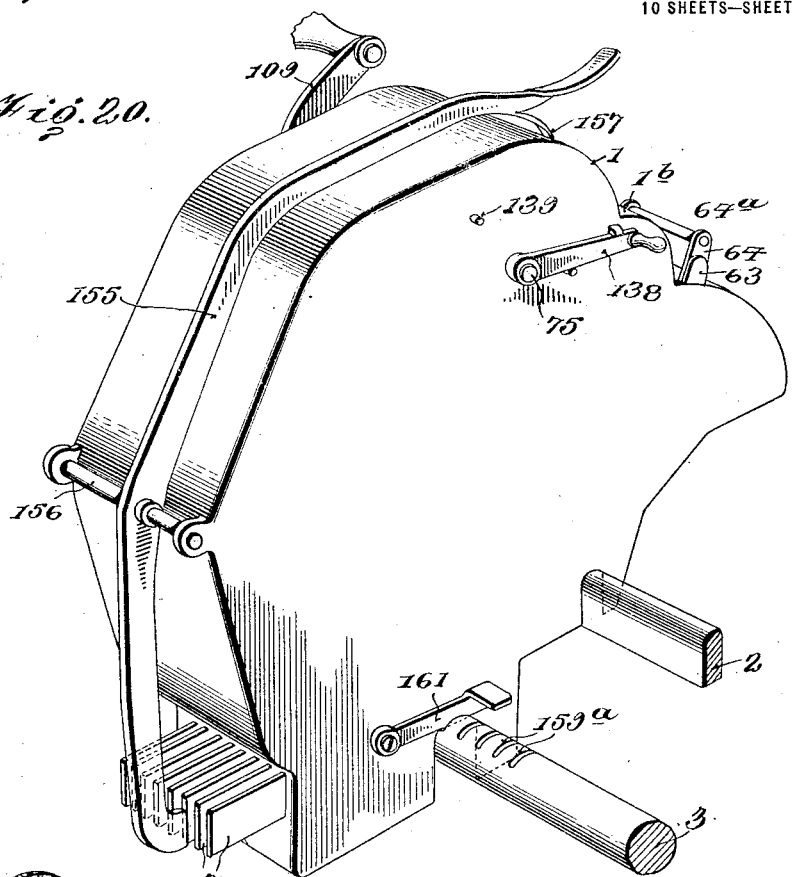
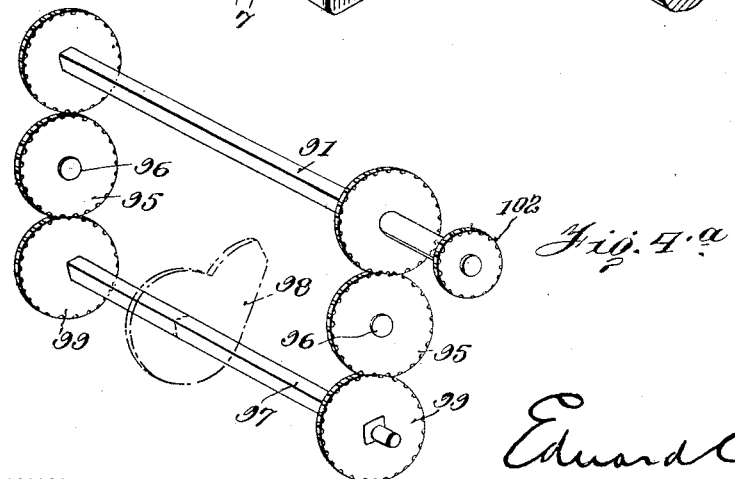

UNITED STATES PATENT OFFICE.

EDWARD C. WALTER, OF NEW YORK, N. Y., ASSIGNOR TO HARRY T. AMBROSE, OF ORANGE, NEW JERSEY.

CALCULATING-MACHINE.

1,224,872. Specification of Letters Patent. Patented May 1, 1917.

Application filed July 6, 1911. Serial No. 637,199.

*To all whom it may concern:*

Be it known that I, EDWARD C. WALTER, a citizen of the United States, residing at New York, in the county of New York and State of New York, have invented certain new and useful Improvements in Calculating-Machines, of which the following is a specification, reference being had therein to the accompanying drawing.

This invention relates to calculating machines and especially calculating machines adapted to be used in conjunction with typewriting machines.

In one aspect, the invention has for its object the provision of a calculating machine adapted to be suitably mounted upon a part of the typewriting machine—which may be of any required construction or make—so that, as requisite, the numbers imprinted upon the work-sheet—whether it be a billing form, a columned page of a book, or of other form—may be added or subtracted on dials or number-wheels so arranged as to be conveniently visible to the operator, said numeral-keys being so connected with the calculating machine that any one of them may be operated without actuating the parts of the calculating machine except as may be desired.

The invention also has for its object an arrangement of the connections between the numeral-keys and the calculating attachment whereby only an actuation of the selecting-mechanism, which forms a part of the structure constituting the calculating machine, shall be effected when any one or another of the numeral-keys is depressed by the operator, there being a mechanism provided for independently actuating said selecting mechanism to effect a computation; so that, to the end that each numeral-key shall be required to do a minimum amount of work additional to its usual operation as an actuating medium for the type-bar, the connections of the numeral-keys and the calculating mechanism are peculiarly arranged, first, in order that no part of the calculating mechanism shall be operated by the numeral-keys when it is not desired to add or subtract and, secondly, when the calculating mechanism is to be operated, only part of said mechanism shall be actuated as includes the selecting-mechanism, wherefore, upon the depression of a numeral-key, only slight additional work is imposed upon that numeral-key in actuating said selecting part of the calculating mechanism, the remaining part of said mechanism depending for its operation upon the actuation of other mechanism to effect the necessary computation.

The invention has also for its object the provision of mechanism by which the actuation of the number-wheels or dials is effected by means which are controlled by but which are actuated independently of the numeral-keys, provision being made, as stated, in independent mechanism to effect successive actuation of the parts of the calculating mechanism and, thus, of the successive number-wheels or dials in the operation of adding or subtracting.

In another aspect of the invention, it includes means for actuating the parts of the calculating mechanism whereby said mechanism is readily converted from an adding machine into a subtracting machine, the actuation of the necessary parts, devices and mechanisms for effecting this change being under the control, preferably, of a single device conveniently arranged on the calculating machine and operating, with certainty and ease, to shift the parts, as may be required, to make the desired conversion.

A further object of the invention is to provide, in such a machine, instrumentalities for resetting any one or more of the denominational actuating members in case of a mistake, and for resetting all of the number-wheels or dials to zero-position, and this whether the machine is, for the moment, being used as an adding machine, or as a subtracting machine.

The present invention is, in part, founded upon the subject-matter disclosed and claimed in United States Patent No. 963,727, granted July 5th, 1910, upon my invention, and includes certain parts, mechanisms and instrumentalities therein disclosed, with additional parts, mechanisms and instrumentalities essential to the adaptation of the machine as a subtracting machine: The machine constituting the subject-matter of the aforementioned patent is adapted to effect a computation by addition, only. My present construction is, therefore, a carrying forward of the structure devised by me for performing the function of computation by addition, and includes such changes in the form of the parts and such additional parts and mechanisms as are required, first, to convert the mechanism for effecting a computation, by addition, into a mechanism for effecting a computation, by subtraction, and the provision, in such a machine, of means for controlling the several parts of the mechanism whereby the necessary positioning of the same may be conveniently effected to convert the mechanism from an adding machine into a subtracting machine, or vice versa.

My present invention, similarly as with that forming the subject-matter of the aforementioned patent, comprehends a calculating machine which may be positioned upon certain parts of a flat-platen typewriter, though it is to be understood that the machine may be equally well adapted for use in the so-called round platen class of typewriting machines. In illustrating the machine as adapted to the first-mentioned class of machines, therefore, it is to be understood that I do not restrict the use of my present invention to that class of machines. Where it is to be attached to the so-called flat-platen class of machines, I prefer to dispose one portion of the attachment upon the line-spacing carriage of the machine, and the other accompanying portion upon the letter-spacing carriage thereof. The particular position of the component parts of the machine, in so far as affects the disposition of the one part upon one particular carriage and the other upon the other carriage, is not peculiarly essential to my invention. I find, however, in the practical use of the machine, that the best results are secured by positioning, upon the line-spacing carriage, the component part of the calculating machine which includes the computer-casing and (what I herein shall refer to as the) "computer-component selecting mechanism," and dispose the other component part, which I shall herein designate the "carriage-component selecting-mechanism" on the letter-spacing carriage. In this arrangement, the computer is relatively stationary, whereas the carriage-component selecting-mechanism has a traveling movement in relation to said computer. The carriage-component and computer-component selecting mechanisms, either or both, as referred to in the claims, will be included in the general designations "selecting mechanism" and "selecting means": Therefore, wherever I herein refer to "selecting means" or "selecting mechanism," generally, it will be understood as including one or the other, or both of these component mechanisms.

In employing the terms calculating attachment, calculator, computer, etc., I refer to and intend to include all such machines as come under the various titles of adding machine, register, computer, computing mechanism, calculator, accumulator, totalizer, and the like.

In the present invention, the same as in my patented invention, the printing or numeral-keys operate only the selecting mechanism to bring certain instrumentalities in the computer into position with reference to an independent operating mechanism, also in the computer, which is then operated to effect a computation and a movement of the denominational wheels of the computer to disclose the results of the computation.

In the present invention, in arranging the parts for coöperative operation, I have constructed them with a view to simplicity and, also, for a certainty of operation whereby overthrow of any of the parts, under the action or momentum thereof, shall not occur and, thus, produce an incorrect computation; and, to this end, have included instrumentalities for insuring the proper position of any one or more parts preliminary to its actuation, and, also, the positive holding of other parts against movement during the actuation of any one or more instrumentalities whose actuation might disturb the position of that part and thus produce an inaccuracy in the computation.

In the accompanying drawings I have illustrated an embodiment of the invention, by way of example, and at this point desire it to be understood that, in exemplifying such an embodiment, I am by no means specifically claiming or restricting myself to that particular form, since other embodiments, adapted to perform the functions and to secure the results for which the illustrated embodiment is designed, are within the spirit of my invention.

In these drawings:

Figure 1 is a view in perspective of the calculating attachment or computer comprising a housing and means for attaching it to any desired part of a typewriting machine;

Figs. 1ᵃ and 1ᵇ are fragmentary and sectional views thereof;

Fig. 1ᶜ is a detail view of a carriage-detent device;

Fig. 2 is a fragmentary view in perspective of that part of the construction which is connected to the numeral-keys, and which constitutes, with the keys, the carriage-component selecting mechanism and whereby the computer-component selecting-mechanism of the computer is actuated and positioned;

Fig. 3 is an aggrouped detail view of the several turn-buckles of the key-lever connections, showing the different lengths;

Figure 4:
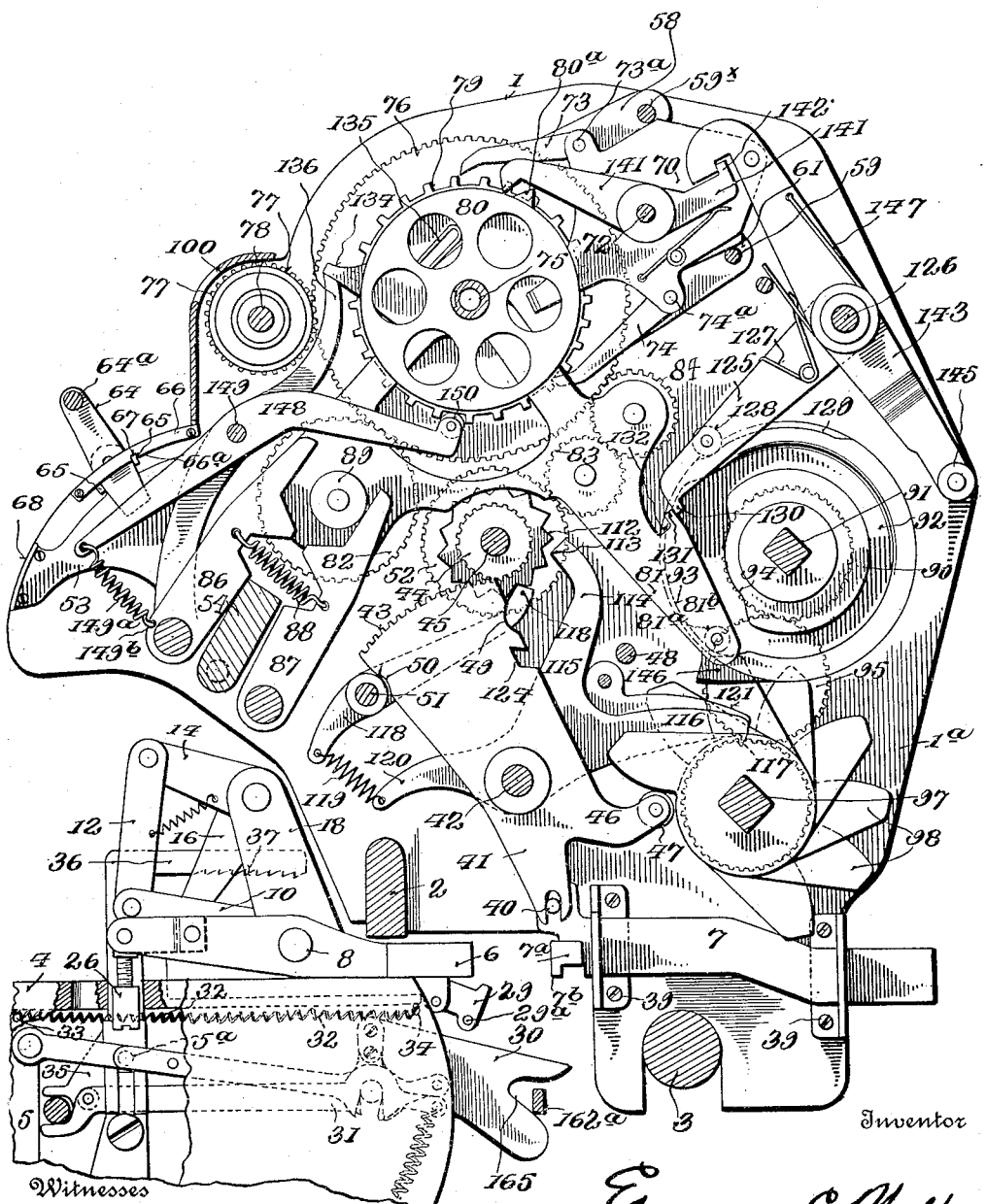
Figure 5:
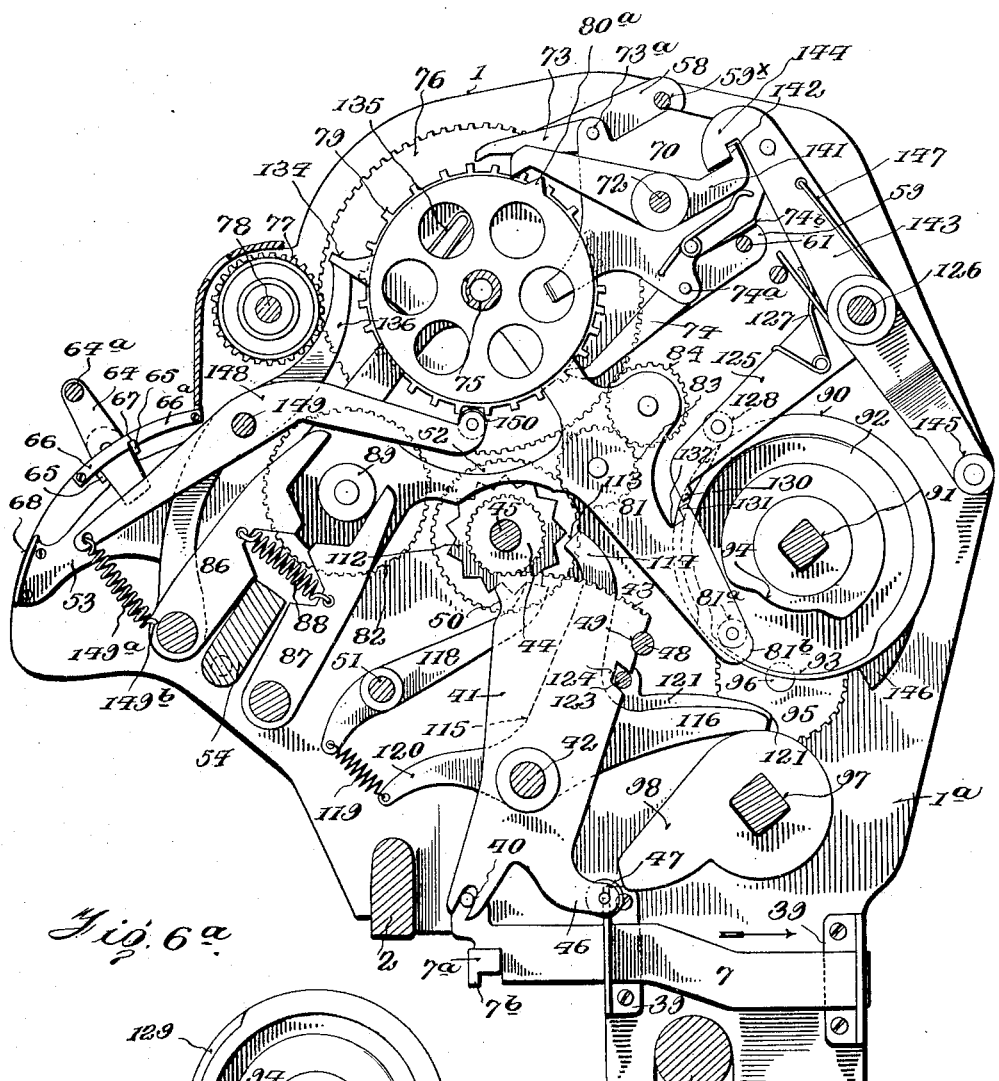
Figure 6:
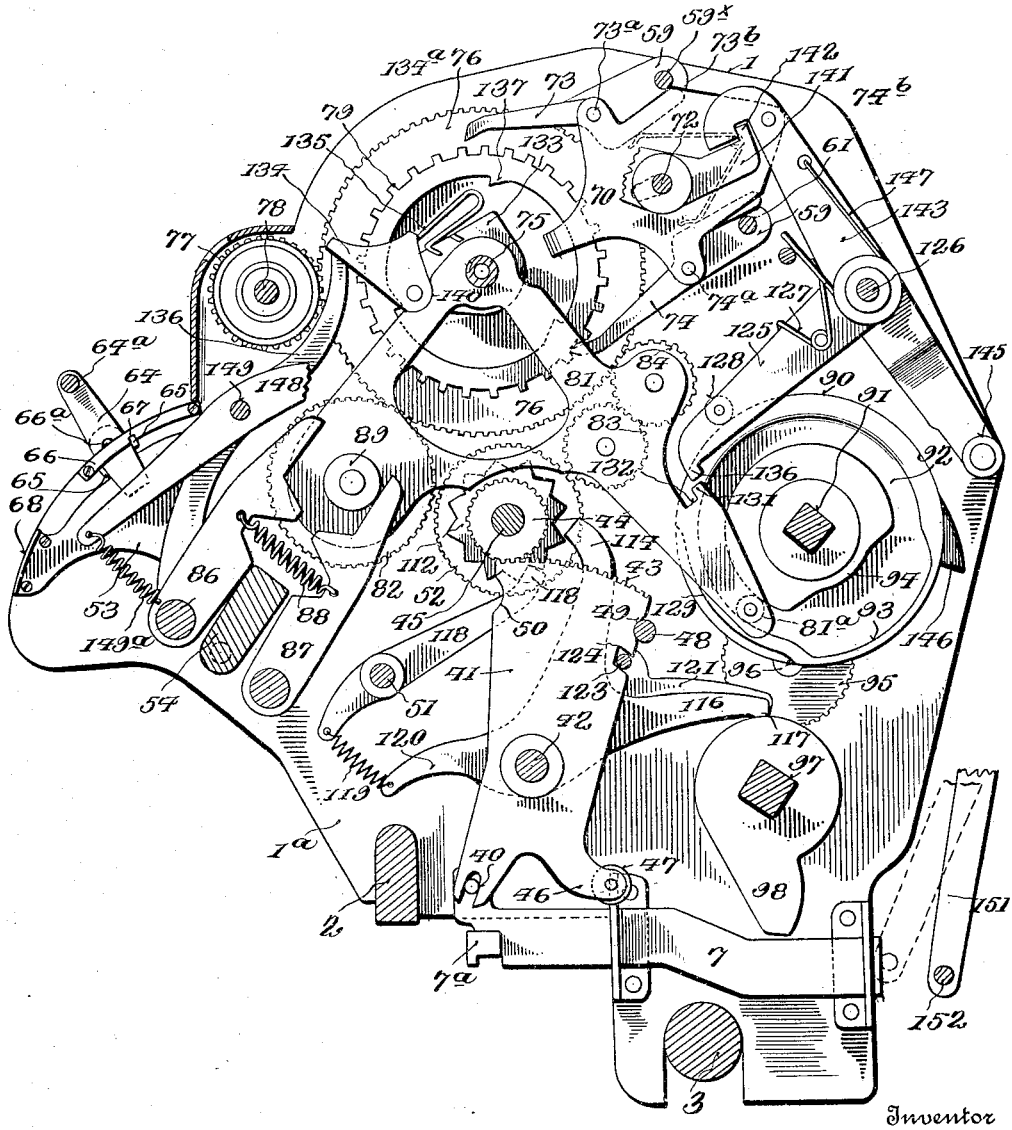
Figure 7:
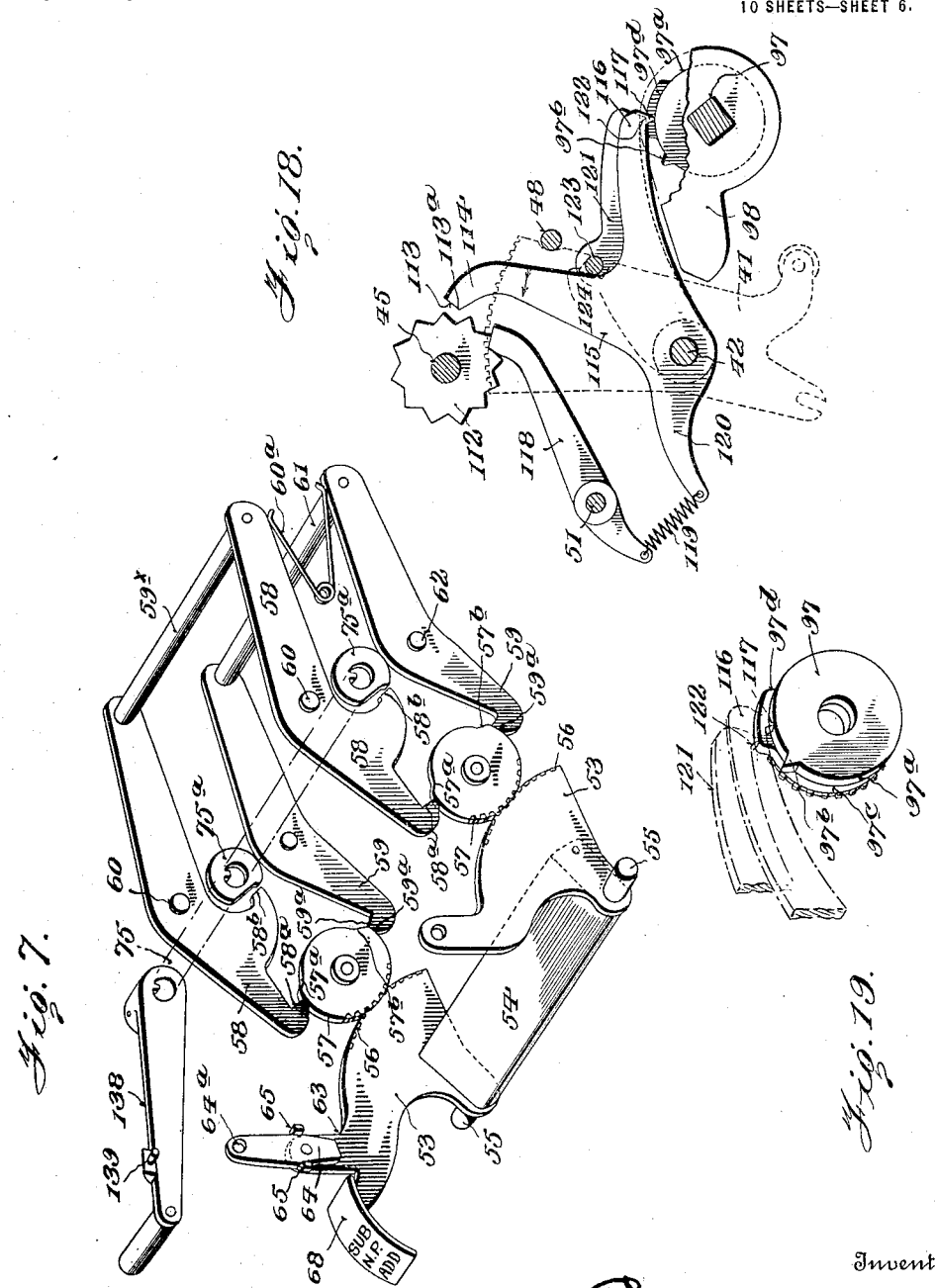
Figure 8:
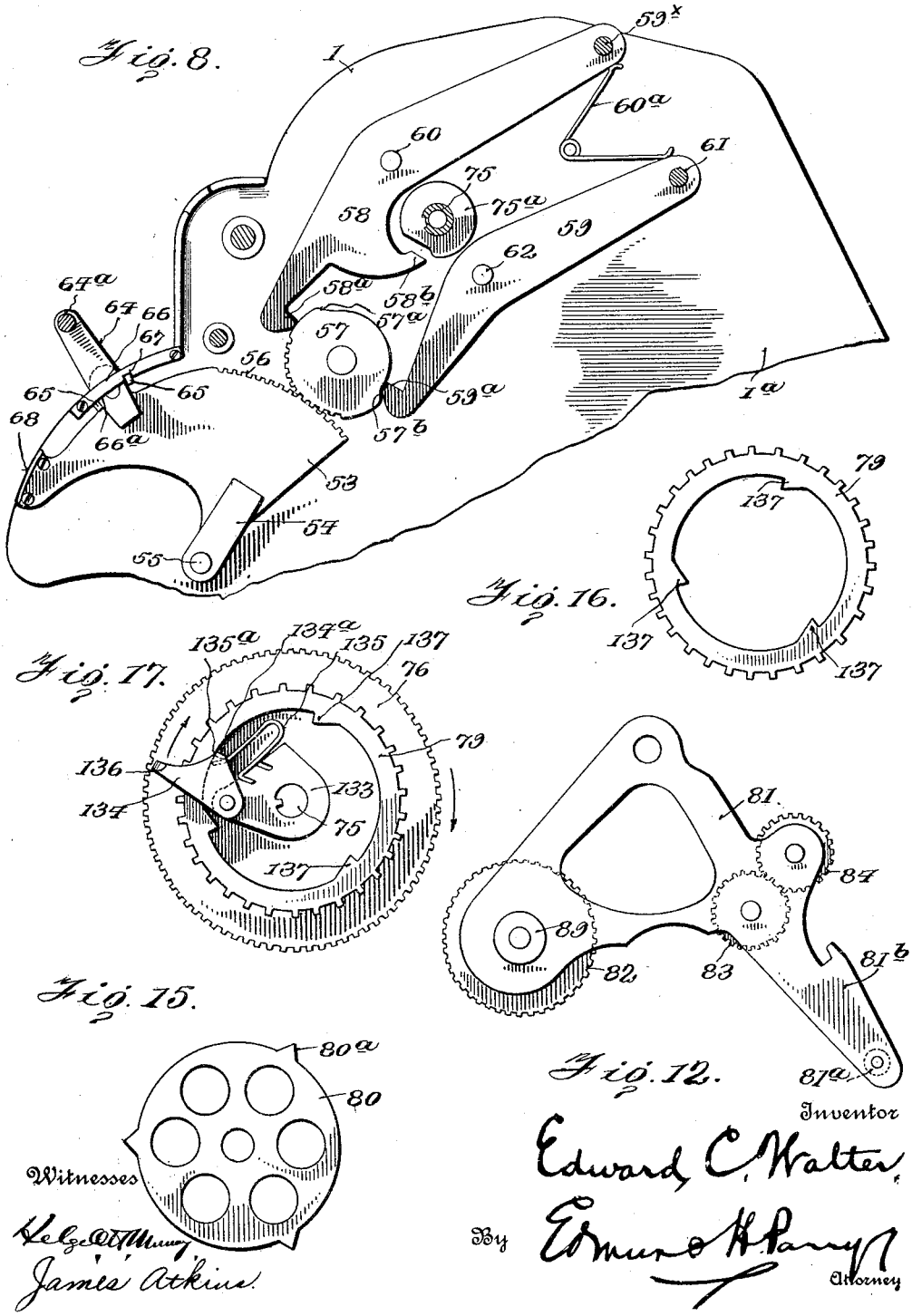
Figure 9:
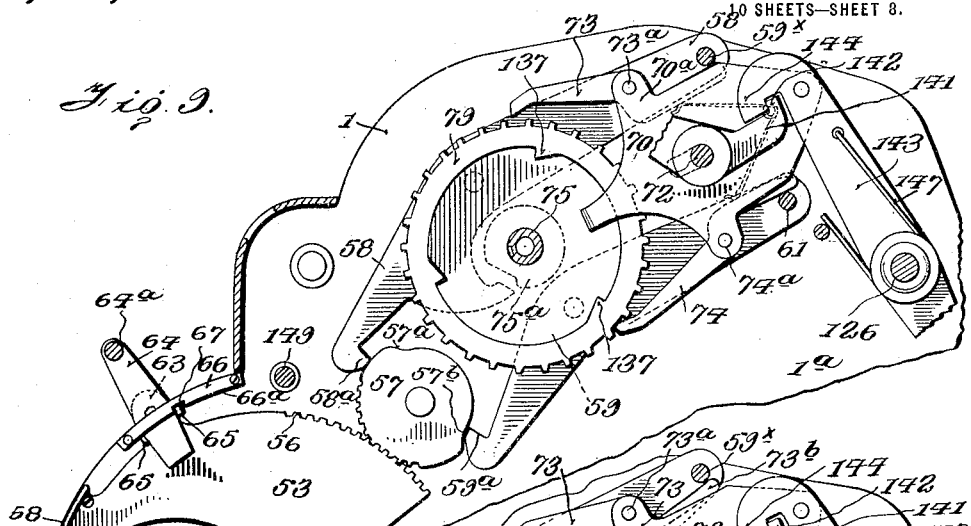
Figure 10:
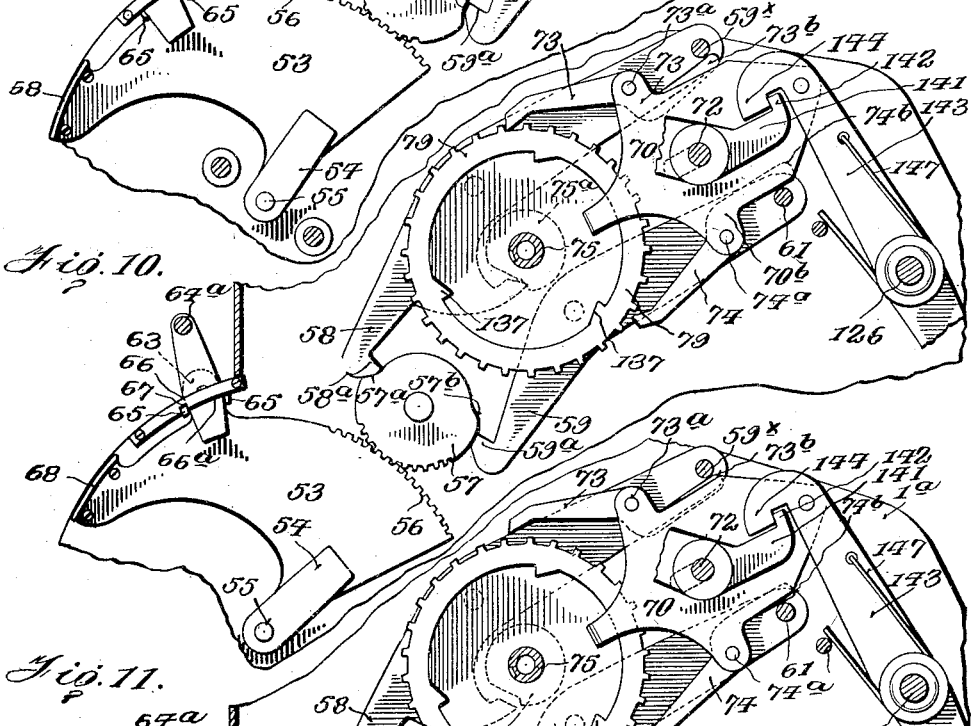
Figure 11:

Fig. 4 is a sectional elevation of the mechanisms of the computing machine and including a portion of the key-actuated devices appearing in Fig. 2, the parts appearing in the position they occupy when set for subtracting and after a key-lever has actuated the selecting-mechanism and just after the initiation of the operation of the actuating mechanism which operates the selecting-mechanism to effect a computation;

Fig. 4ª is a view in perspective of the mechanism for driving certain of the parts and constituting an actuating mechanism;

Fig. 5 is a similar view (but with the key-actuated parts omitted) showing the parts in the position they assume after the actuating element has been moved through a part of its cycle of travel, whereby it has simultaneously restored the parts of the computer-component selecting-mechanism to normal position and actuated the mechanisms which control the operation of the number-wheel;

Fig. 6 is a view similar to Fig. 5 showing the actuating element somewhat advanced in its cycle of movement for operating the mechanism which controls the number-wheel in the operation of effecting a computation;

Fig. 6ª is a view of a modified form of cam-disk;

Fig. 7 is a fragmentary view of the mechanism for controlling the position of the parts whereby the same may be moved into one or another of a plurality of positions to effect a computation, either by addition, or by subtraction, or into a non-producing or neutral position;

Fig. 8 is a sectional elevation of the same;

Figs. 9, 10 and 11 are fragmentary views in sectional elevation showing the computation-controlling parts in the positions they assume when actuated, first, to effect a computation by subtraction; secondly, to effect a computation by addition; and, thirdly, when rendered inactive for the non-production of any computation;

Fig. 12 is a detail view of a pinion-carrying member, the position of which, relative to the carrying mechanism, and the number-wheel actuating instrumentalities determines the position or movement of the number-wheel;

Fig. 13 is a fragmentary view in perspective illustrating particularly the parts which control the carrying mechanism;

Fig. 14 is a fragmentary view in elevation showing certain of the coöperative parts constituting the carrying mechanism of the computer;

Fig. 15 is a detail view of a star-wheel or disk forming another part of the carrying mechanism;

Fig. 16 is a similar view of the toothed or ratchet-wheel similarly forming a part of the carrying mechanism;

Fig. 17 is a detached view showing parts of the carrying mechanism and, also, the device for returning the number-wheels and the adjunctive parts for controlling the same, to zero-position;

Fig. 18 is a fragmentary view showing, on an enlarged scale, a form of device for insuring the proper position of parts of the computer-component selecting-mechanism preparatory to being actuated to effect a computation;

Fig. 19 is a fragmentary view in perspective of certain of the parts illustrated in Fig. 18, a portion of the same being omitted and other portions being broken away more clearly to show the cam-surface and the parts which co-act therewith; and Fig. 20 is a fragmentary view in perspective of a modified form of device for resetting the selecting mechanism.

Referring more specifically to the drawings, the numeral 1 designates, generally, the calculator mounted on parts, which may be designated generally by the numerals 2 and 3, of the line-spacing carriage of a Donning machine, here shown in part merely for convenience of illustration of the present invention, but which appears more fully in the aforementioned Patent No. 963,727. Mounted to travel horizontally on the line-spacing carriage of such a machine, is a letter-spacing carriage, of which the top plate 4 appears in Figs. 2 and 4, and which constitutes a support for the carriage-component selecting mechanism, interposed between the printing-keys, on the one part, and the computer-component selecting-mechanism, on the other part, and which latter is housed within the casing 1, as will more fully hereinafter appear.

For clearness of description and convenient reference, I shall now proceed to describe my invention under three general headings, to-wit:

1. Carriage - computer selecting - mechanism.

2. Computer-component selecting-mechanism.

3. Computing mechanism.

Under the first and second headings, I propose to describe, briefly, the mechanisms utilized to make a selection; and, under the third heading, the mechanism which—the selecting-mechanism having been positioned—is operated by actuating mechanism to effect a computation.

As my machine is adapted to effect a computation, both by addition and subtraction, I shall separately describe the structure as operating as an "adding mechanism," as a "subtracting mechanism," and, then, as a "non-producing mechanism."

1. *Carriage-component selecting-mechanism.*

As the carriage - component selecting-mechanism which I now employ so fully appears in the aforementioned patent, it is not deemed necessary to describe the same in great detail. For the present, it will suffice to state that there are disposed in the letter-spacing carriage a plurality of typebar actuating or key-levers, of which some are utilized as numeral-keys to imprint numbers upon the work-sheet, in whatever form the latter may be. In Fig. 2, two of these numeral-keys 5, 5, are shown as exemplifications of the parts constituting such numeral-keys and, through interposed mechanism, now to be described, these several numeral-keys are connected to a plunger 6 which is adapted successively to engage a series of selectors or selecting-levers 7 disposed in the casing 1, and which plunger is adapted to be reciprocated on each stroke of a numeral-key as the letter-spacing carriage travels laterally across the printing-surface and in juxtaposition to said selecting-levers 7. This plunger 6 is adapted to have imparted to it a differential movement whereby a differential actuation of the selecting-mechanism of the calculator is effected. To this end, there are journaled in suitable brackets on the top-plate of the letter-spacing carriage, plunger-operating shafts 8, 8, to the inner ends of which are fixed arms 9, 10. Pivoted to these arms are links 11, 12, respectively, and to these is connected a bell-crank-structure preferably comprising arms 13, 14, an interposed sleeve 15, and a pendant link 16. Brackets 17, 18 are provided for supporting said plunger-operating shafts 8, 8, and, also, said bell-crank-structure. The pendant arm or link 16 is provided at its lower end with an elongated slot 19 forming a loose connection with a slide 20, said elongated slot in the link 16 permitting it to have a swinging movement and allowing a straight movement of the slide 20.

The plunger 6 is preferably pivoted to swing on a vertical axis in one direction only, and is held against movement in the other direction by an upstanding pin 21, a spring (not shown) acting against the opposite side of the plunger to hold it against said pin. This permits a slight shifting movement of the plunger in a direction opposite to that of the normal travel of the letter-spacing carriage so that, in the event that the escapement mechanism (not shown) should operate to move the carriage before the plunger has been fully returned to normal position, the plunger will have a slight yielding movement when it strikes one or another of the levers 7 in the computer and, therefore, permit free travel of the carriage without binding and without danger of bending or breaking of the parts.

Fixed upon the plunger-operating shafts 8, 8, are arms 22; and, adjacent to each of these arms is a second arm 23 which is loose upon the shaft, and carries a lug 24 into which is threaded an adjusting screw 25 adapted to bear upon the upper edge of the fixed arm 22.

It will be understood that the downward movement of any particular arm 23 will, through the interposed parts 24 and 25, actuate the fixed arm 22 and thereby rock the shaft 8. The adjusting screw 25 affords a means for adjusting the extent of rocking movement of the shaft 8 when the arm 23 is actuated to move the arm 22.

Pivotally pendant from each of the arms 23 is a turn-buckle 26 having an elongated slot 27 in its lower portion and having, at the bottom of the slot, a stop 28 adjustable on said turn-buckle to vary the size of the slot 27. Into the slot 27 projects a pin or stud 5ª carried by the key-lever which is adapted to actuate that particular part of the mechanism. There are as many turn-buckles as there are numeral-keys, namely, nine and, therefore, the slots are, as shown particularly in Fig. 3, all of different lengths, that for key No. 9 being the shortest, that for key No. 1 being the longest, and the others varying regularly and successively between these elements. It will be understood, therefore, that as the slot for key No. 1 is long, this particular key-lever may move down a considerable distance before its pin or stud engages in the bottom of the slot in its respective turn-buckle; and, by this arrangement, the extent of movement of the turn-buckle is comparatively slight; whereas, in the case of key-lever No. 9, the slot in the turn-buckle being short, there is comparatively little lost motion and a corresponding increase in the extent of movement of the turn-buckle. The movement of any one of the turn-buckles being communicated, through the arms 22 and 23, to the aforementioned arms, rocks the plunger-operating shaft 8 and, this in turn, through the described bell-crank-structure, actuates the plunger 6, and to a distance corresponding with the extent of movement of the rock-shaft 8 which, as already described, is primarily determined, so far as concerns its extent of movement, by the length of the slots 27 in the turn-buckles 26. Inasmuch as the plunger 6 is the means for moving each of the selecting-levers 7 to position the computer-component selecting-mechanism (presently to be described) in the computer for engagement and actuation for operating the denominational-wheels of the computer, to produce a computation, the different selecting-levers 7 will be moved greater or lesser distances, respectively, and the selecting-devices be accordingly positioned; in correspondence with the extent of movement of the rock shaft 8.

It will be understood that, by reason of the particular manner of arranging the arms 22 and 23, only that arm 23 which is actuated by its particular key-lever is depressed by the operator. All of the other arms 22 will be rocked away from their respective adjusting screws 25 without, at the same time, effecting any movement of its proximate arm 23. In this way, none of the other key-levers are actuated when any one particular key is depressed by the operator, as would be the case if the arms 22 and 23 were connected together, or if the turnbuckles 26 were connected to a single arm fast on the rock-shaft. It will be understood that the actuation of the plunger 6 impinges it against the projecting end 7ª of one or another of the selecting-levers 7, whereby the latter are reciprocated for a purpose presently to be described. As a means for positively controlling the exact extent of movement of a selecting-lever 7 and to prevent any overthrow movement thereof, means are provided for temporarily effecting an interlocking of the selective-lever 7 to the plunger 6. To this end, a spring-controlled latch 29 is pivoted at the outer end of the slide 20 and carries a stud 29ª adapted to be engaged by a vertical oscillating member 30 carried and actuated by a link 31 forming a part of a structure of the machine adapted to oscillate upon each depression of, and be controlled in its actuation by, one or another of the key-levers. The latch 29, when engaged and raised by the member 30 engages back of a lug 7ᵇ depending from the enlarged end 7ª of the selecting-lever 7 and, when interlocked therewith, prevents inaccurate or excessive movement of the engaged selecting-lever 7. It is to be understood of course that this latch moves along as the letter-spacing carriage travels, and acts in the same manner, successively, on each of the different selecting-levers 7 after each spacing movement of said carriage takes place.

To restore the parts already described to normal position, a retractile spring 32 is provided and connects, at one end, with a stud 33 depending from the lower face of the top-plate 4 and, at its other end, to a stud 34 depending from the lower face of the slide 20. Under the influence of this spring 32, the plunger is returned to starting position immediately after the latch 29 disengages from the lever 7 and, as the slide is being returned to its normal position, it actuates the parts which connect therewith and restores them to normal position. Pivotally mounted at one end of the link 31 is an upwardly-extending lever 35 angulated at its upper end to provide a horizontally-extending member 36 which, on its lower surface, is provided with a plurality of teeth or serrations 37 (preferably eight) adapted to engage with a stud 38 projecting from the side of the slide 20 and having an angular upper edge, as shown in Fig. 2. When the link 31 moves downwardly, it operates, through the lever 35, to lock the angulated member 36 into holding engagement with the stud 38, and this prevents excessive forward movement of the entire selecting-mechanism.

The parts are so positioned and related that, upon the downward movement of said angulated member 36, for numeral-key 1, for instance, the stud 38 will be held by the first of the teeth or serrations 37; and for numeral-key No. 2, by the second tooth, and so on. As the action of the link 31 is always the same, the said member 36 will always have the same movement, insuring accurate stopping movement of the selecting-mechanism at the proper point to accord with the numeral being selected. Although the movement of said angulated member 36 is always the same, as stated, it is to be noted that while is is moving into its engaging position, the plunger 6 has a differential movement for the different keys, namely, a distance of one increment for key No. 1, two increments for key No. 2, and so on, which differential movement is effected by the mechanism already described. It will be noted that there are only eight teeth on the number 36 because it is never essential to prevent excessive movement when key No. 9 is depressed, because this will always properly actuate its adjunctive parts to the limit of their movement. When writing at normal speed, it would generally be unnecessary to provide the locking instrumentalities just described; but, where the typewriter is being rapidly operated, there is a tendency toward excessive movement of the parts by reason of a natural overthrow tendency thereof, and, also, to take up any loose movement that might occur by reason of wear of the parts, etc.

The structure described forms one part of the selecting-mechanism of the computer,— and as already specified, is the carriage-component of such selecting-mechanism— and this part is supported by and travels with the carriage upon which it is mounted. The part of said selecting-mechanism (including the selecting-lever 7) already referred to as the computer-component thereof, is mounted in and housed by the casing 1; and I will now proceed with a description of this under the heading of 2. *Computer-component selecting-mechanism.*

This selecting-mechanism, within the casing, is the same for each denominational-wheel or dial, a plurality of which are shown in the present embodiment. A description of selecting-mechanism for one denominational-wheel will, of course, suffice for all: The selector or selecting-lever 7, by which the parts are selected for actuation, comprises, as shown, an elongated member supported in brackets 39 secured in the lower part of the casing 1. Attached, by a pin-and-slot connection 40 to the selecting-lever 7, at its forward end, is an elongated oscillating segment-plate 41 loosely mounted upon a shaft 42 and provided on its upper edge with teeth 43 adapted to mesh with a pinion 44 loosely mounted on a shaft 45, adapted to perform functions presently to be explained. At this stage, it will suffice to say that, when the selecting-lever 7, under the influence of the plunger 6, is actuated in the direction indicated by the arrow (Fig. 5), the segment-plate 41 will be rocked on its axis and effect a partial rotation of said pinion 44, whereupon it comes to rest and remains in this position until restored to normal position by the segment-plate 41 when it, itself, is returned to starting position in a manner presently to be described.

The segment-plate is provided with a foot-extension 46 which is preferably bifurcated to support an anti-friction rolling-element 47.

Normally, the segment-plate 41 occupies the position shown in Fig. 5. When the selecting-lever 7 is actuated in the manner described, the plate 41 is shifted to the position shown in Fig. 4 or to any predetermined intermediate position, according to the selection effected by the selecting-mechanism, already referred to. To the end that the shifting movement of the plate 41 shall be limited, in both directions, I provide a bar 48 extending between the sides 1ª of the casing 1, and adapted to be engaged by a curved recess 49 formed in the right-hand edge of the plate 41. At the opposite edge, the plate 41 is similarly formed with a curved recess 50 adapted to engage a shaft 51, as shown in Fig. 4. By these means, the extent of rotation of the pinion 44 is positively controlled, and this is essential to secure accuracy in this structure, because the extent of rotation of said pinion 44 controls the extent of rotation of a larger pinion 52 which is, like the pinion 44, loose on the shaft 45. Both pinions 44 and 52 are adapted to have only a partial turn, whereupon their rotation is, in a manner presently to be explained, reversed and they are then rotated back to starting position.

The parts and devices just described constitute, as heretofore stated, the second component of the selecting-mechanism, and their position determines the extent of actuation of the parts, forthwith to be described, which operate to effect the computation, and which I shall now describe under the third heading, already designated, of

3. *Computing mechanism.*

Under this heading, I shall first describe the mechanisms for positioning the parts whereby they are adapted to effect a computation either by addition or subtraction, or rendered neutral whereby non-production of a computation results:

The mechanism for predetermining the character of computation includes, by preference, a single mechanism, under the control of the operator, and, in one aspect of the invention, includes, among other elements, two plates 53, 53, disposed at opposite sides of the casing 1 and connected together by a bar 54, in which stub-shafts 55 are disposed, at its opposite ends, and suitably journaled in the sides of the casing. Each of the plates 53, at its upper curved periphery, is provided with teeth 56 with which meshes a cam-disk 57. Embracing the opposite sides of the cam-disk 57 are two shifting plates 58, 59. There are two of these plates 58, one at each side of the casing and these are connected, at their rear ends, by a cross-bar 59ˣ and fulcrumed at 60 on the sides 1ª of the casing 1. Similarly, the plates 59 are connected at their rear ends by a cross-bar 61 and are pivoted at 62 upon the sides of the casing. The inner ends of the plates 58 and 59 are provided with inwardly-extending noses 58ª, 59ª, which are adapted to ride upon the untoothed portion of the periphery of the cam-disk 57 at opposite sides of its axis and alternately travel upon the cam surfaces 57ª and 57ᵇ, respectively. The noses 58ª and 59ª are held against the periphery of the cam-disk 57 by a spring 60ª, as shown. As will be seen by referring particularly to Figs. 7 to 11, the positions of the cam-disks 57 are controlled by the oscillating plates 53, when the same are moved on their horizontal axes. Pivoted on an extension 63 of each of the oscillating plates 53 is a detent member 64 which, at its sides, is provided with outstanding lugs 65, 65. The two detents are connected by a cross-piece 64ª whereby they are actuated together. Secured to, but spaced from, the inside wall of the casing is an arch-shaped guide member 66. The detent-member 64 is adapted to slide along the inner face of the guide member 66. The lower periphery 66ª of the member 66 is provided, centrally, with a recess or indentation 67 in which one or another of the lugs 65 is adapted to engage, as shown for instance in Fig. 8, and by which means the detent member 64 and, thus, the plates 53 are adapted to be temporarily held against movement. Suitably mounted upon the left-hand plate 53 is an indicating plate 68 which bears the designation "Sub." to indicate subtraction; also "N. P." to indicate non-producing; and, also, "Add." to indicate addition. The plate 68, which is preferably curved, as shown, is adapted to be shifted by the plate 53 to position one or another of said designations in register with an elongated opening 69 in the front plate 1ᵇ of the casing 1, (Fig. 1) and whereby the operator has, within the line of vision, an indicator to enable her to determine whether the parts of the calculating machine are set to effect a computation by subtraction, or by addition, or occupy a neutral position whereby no computation can be produced. In Figs. 9, 10 and 11, the three possible positions of the parts which predetermine the character of computation to be effected are disclosed: In Fig. 9, the mechanism is set for subtraction; and, in this instance, the upper lug 65 on the detent 64 occupies the recess 67 in the guide-bracket 66. In moving the detent 64 to position the upper lug 65 in the recess 67, the oscillating plates 53 are rocked on their axes and thereby rotate the cam-disks 57 to position the nose 59$^a$ of the pawl 59 in the cam-depression 57$^b$. The nose-extension 58$^a$ of the plate 58 will then occupy a position upon the raised portion of the periphery of the cam-disk 57. When the parts are in the position thus described, they will have positioned other parts of the structure (presently to be described) to effect computation by subtraction.

In Fig. 10, the parts are shown as occupying the position they assume to effect computation by addition: In this instance, the detent 64 has been moved by the operator backwardly to position the lower lug 65 thereon into the recess 67 in the guide-bracket 66; and, in thus positioning these parts, the oscillating plates 53 will have been rocked on their axes and effected a rotation of the cam-disk 57 to position the cam-depression 57$^a$ opposite the nose-extension 58$^a$ of the plate 58 and simultaneously cause the nose-extension 59$^a$ to ride upon the raised portion of the cam-periphery of said disk. While these parts are being thus positioned, they will have actuated the other parts of the structure (already referred to as to be described) to effect a computation by addition.

In Fig. 11, the parts are shown in the position they assume when occupying a neutral position; that is to say, a position which precludes a computation either by subtraction or by addition: In this instance, the detent has been shifted to occupy a central position with relation to the center of the guide-bracket 66 and, thus, the oscillating plates 53 will have rotated the cam-disks 57 so that neither of the plates 58 nor 59 will have their nose-extensions seated in the cam-depressions in said cam-disks.

From the foregoing description, it will have been understood that there are two of the plates 53 connected by the bar 54 for unison of action; two of the cam-disks 57 to mesh with the plates 53, and a pair of the plates 58 and 59 disposed at opposite sides of the casing 1 and connected respectively by the cross-bars 59 and 61, respectively, as already described.

As the setting-mechanism above described is entirely independent of the selecting-means, it follows that it may be operated irrespective of whether a selection has first been made; that is to say, this setting-mechanism may be shifted either before or after a selection by the selecting-mechanism has been effected.

It will now be in order to describe the parts affected by the positioning of the plates 58 and 59, since these are the elements, in conjunction with those already described, which control the character of the computation to be effected by the machine, and it may be here stated that there will be a complete set of these parts, now to be described, for each of the series of number-wheels or dials employed in the machine:

Arranged in juxtaposition to the plates 58 and 59, and lying in a plane parallel therewith, is a pawl-carrying plate 70 provided with a central elongated slot 71 through which projects a cross-bar 72 constituting a support for each of the series of these plates 70. On opposite edges of the plates 70, extensions 70$^a$ and 70$^b$ are formed to provide a support for oppositely-disposed pawls 73 and 74. These pawls 73 and 74 are provided, beyond their fulcrums 73$^a$ and 74$^a$, with engaging portions 73$^b$ and 74$^b$, which are arranged in the path of movement of the cross-bars 59$^\times$ and 61, respectively, which connect the respective pairs of the plates 58 and 59, already described. When, therefore, the plates 58, for instance, are rocked on their fulcrums 60, the bar 59$^\times$ will engage the extensions 73$^b$ of the pawls 73 and actuate them. Similarly, when the plates 59 are rocked on their fulcrums 62, the cross-bar 61 is positioned to engage and move the engaging extension 74$^b$ of the pawl 74 to actuate them.

The elements affected by the actuation of these parts will now be described:

Supported upon a transverse shaft 75 are a series of gears 76 adapted to mesh with and control geared number-wheels or dials 77 supported on a transverse shaft 78 arranged in parallelism with the shaft 75. Rigidly connected to each of the gears 76 is a toothed or ratchet ring or wheel 79, and with this the pawls 73 and 74, already described, are adapted to coact and control the direction of rotation, first, of said ratchet-wheels and, thereby, of the gear-wheels and, through these, of the number-wheels or dials 77. To perform the functions presently to be explained, it will be understood that the gear 76 and number-wheel 77 are loose on their respective shafts. On the side of the gear 76, opposite to that to which the ratchet-wheel 79 is attached, is secured a star-wheel or toothed disk 80, the function of which will forthwith be set forth.

Having thus described the manner in which the direction of rotation of the gears 76, and, through these, of the number-wheels 77, is controlled, a description of the mecha- nism interposed between the pinions 52, already described, and said gears 76, whereby the latter are actuated, will indicate the coaction between these several structures of the machine: Arranged in juxtaposition and in parallelism with the faces of each of the gears 76 and the pinions 52 is a pinion-carrying member 81, which, at its upper end, is fulcrumed on the shaft 75 which, as already stated, supports the gears 76. Rotatably mounted on the left-hand lower portion of the plate 81 is a single pinion 82 which, as shown, is adapted to mesh constantly with the gear 76 and alternately with the pinion 52. Similarly mounted at the opposite, right-hand portion of the member 81 are two smaller gears 83, 84 arranged constantly to mesh with each other, and with the gear 76, and alternately with the actuating pinion 52, and be thereby driven to effect a rotation of the gear 76 when positioned in mesh therewith. The plate 81 is adapted to be rocked on its fulcrum (the shaft 75) alternately to position the gear 82 in mesh with the pinion 52, and the pinion 83 in mesh with pinion 52. Whichever of these pinions, namely 82, on the one side, or 83, on the other side, is in mesh with the pinion 52, will determine in which direction the gear 76 will be rotated. As already explained, the plate 81 is shiftable to position the respective pinions alternately in engagement with the pinion 52. The shifting of the plate 81 is effected synchronously with the actuation of the pawls 73 or 74 into holding engagement with the ratchet-wheel 79, as already described. This synchronous movement of the plate 81 is primarily controlled by the setting detent 64 and the oscillating plates 53 by reason of the connection therewith of the following parts:

Extending transversely between the plates 53 is the bar 54, already described, and which also occupies a position between two spaced jaw-members 86 and 87 which are fulcrumed at their lower ends, and connected intermediate of their ends by a retractile spring 88, the action of which is to draw the two jaw-members toward each other. The outer ends of these jaw-members 86 and 87 are adapted to engage, both together or alternately, a boss 89 formed on one face of the pinion-carrying member 81. When the setting-lever is in the position shown in Fig. 11, that is, the non-producing position, the jaw-members will both be in engagement with said boss. When, however, said setting detent is shifted to position the parts for subtraction, for instance, the bar connecting the plates 53 will move the jaw-member 86 away from the boss 89, as shown in Fig. 4. By this operation, the spring 88 is tensioned and tends to force the jaw-member 87 against the boss 89. Under this influence, the pinion-carrying member 81 will be caused to shift on its fulcrum and position the pinion 82 into mesh with the pinion 52. If both jaw-members 86 and 87 are in engagement with the boss 89, the spring 88 remains unflexed and, therefore, there is no influence working upon the plate 81 to change its position, wherefore both sets of pinions on the plate 81 are held out of mesh with the pinion 52.

It must be stated, at this stage, that the initial positioning of one or another of the jaw-members 86 or 87 away from the boss on the member 81 to produce a tension upon the retractile spring 88 in order that it may, under the influence of this spring, shift the member 81, does not, in and by itself, effect a shifting of said member 81, because said member 81 acts also under the influence of another set of parts, now to be explained:

For each of the series, already referred to, a cam-disk 90 is supported upon a transverse shaft 91 and is provided with a cam-groove 92 formed in the face of said cam-disk 90. For the most part, said cam-groove 92 is circular. As appears in Figs. 4, 5 and 6, the cam groove is, at one portion, widened to provide an outer cam-surface 93 and an inner cam-surface 94. In this cam-groove 92 a stud 81ª, secured in one face of the lower limb 81ᵇ of the pinion-carrying member 81, is adapted to travel and, according to whether it is moving in the circumferential portion of the cam-groove, or against one or another of the cam-surfaces 93, 94, the position of said pinion-carrying member 81 is affected. The outermost cam-disks 90 are provided on their outer faces with gear-sections, with which mesh pinions 95 rotating on stub-shafts 96. Arranged in juxtaposition to the pinion 95 is a rotatable actuating element, which, in this instance includes a shaft 97 and plurality of cammed extensions 98 mounted thereon, each successive extension radiating from the body-portion of the element in a relatively different direction, as clearly appears in Fig. 4, and for reasons presently to be explained. At the extremities of said actuating element are pinions 99 (Fig. 4ª) adapted to mesh with the pinions 95, the rotation of which is effected by the cam-disks 90. It will now be understood that the rotation of the cam-disks 90 will turn the pinions 95 and thereby rotate the actuating-elements including shaft, cams 98, etc., 97 and, simultaneously, the stud 81ª carried by the pinion-carrying plate 81 will be caused to traverse the cam-groove 92. While said stud is traveling in the circular portion of the groove, the plate 81 is held stationary temporarily. When, however, said stud arrives at the enlarged portion of the groove, it will be caused to travel on either the cam-surface 93 or the cam-surface 94, according to which of the jaw-members 86, 87 is in engagement with the boss 89. For instance, and referring to Fig. 4, the jaw-member 87 by pressing against the boss 89 is adapted to effect a shifting of the member 81 the moment the stud 81ª reaches the enlarged portion of the cam-groove and, under the influence of the spring 88, said member 81 is pulled toward the left and caused to travel upon the cam-surface 93. While thus traversing this cam-surface 93, the member 81 will shift toward the left and position the pinion 83 in mesh with the actuating pinion 52 which, by rotating in a counterclockwise direction turns the pinion 83 in a clockwise direction and this in turn, by meshing with its companion pinion 84 turns it in a counterclockwise direction, whereby the gear 76 is caused to rotate in a clockwise direction, and thereby effect a counterclockwise rotation of the number-wheel 77. These movements of the described parts will have operated to effect a computation by subtraction. If, however, the setting detent 64 is shifted to a position that will bring the portion of the indicator plate 68, bearing the designation "Add.", into register with the opening 69, and whereby the oscillating plates 53 are shifted backwardly to actuate the parts into the position illustrated in Fig. 10,—wherein the pawl 73 is in holding engagement with the ratchet-wheel 79 and the pawl 74 is out of engagement therewith—and the jaw-member 87 be shifted away from the boss 89 whereby to cause the spring 88 to pull the jaw-member 86 into engagement with said boss 89, the gear-carrying plate 81 is then brought into readiness to be shifted toward the right when the stud 81ª passes from the circular portion of the cam-groove 92 into the enlarged portion thereof and into engagement with the inner cam-surface 94. This movement will have shifted the companion gears 83 and 84 beyond the control of the actuating gear 52 and moved the other gear 82 into mesh with said actuating gear 52. The pinions, whichever is in mesh with the actuating pinion 52, will be held in engagement therewith until the stud 81ª travels off the cam-surface—whether it be 93 or 94—and into the circular portion, whereupon said pinion will be disengaged from the pinion 52. While in engagement therewith, however, they will have performed their function of actuating the gear 76, and, thereby, the number-wheel 77.

In describing the cycle of movement of the parts, when the machine is set for subtraction, the direction of rotation of the gear 76 and the number-wheel 77 was explained. It will be understood, now, that when the structure is set for addition, the gear 76 and the number-wheel 77 will be actuated in the opposite directions from those specified, namely, the gear 76 will be turned in a clockwise direction and effect a counterclockwise rotation of the number-wheel.

The segment plate 41 has already been described as constituting an element of the computer-component selecting-mechanism of the construction. As it is in constant mesh with the pinion 44, which is secured to the actuating pinion 52, said member 41 becomes an actuating connection between the actuating element 97 and said actuating pinion 52. That is to say, when the actuating element 97 is rotated, and the extension 98 is adapted to engage the roller 47 on the foot-extension 46 of said plate 41 to move the same on its axis 42 and, in this way, through the geared portion 43 thereof, the pinions 44 and 52, are rotated to drive either the pinion 82 or the companion pinions 83 and 84, and through one or the other of these to rotate the gear 76 and, thereby, effect a predetermined rotation of the number-wheel 77. It will have been understood that when the selecting-lever 7 is actuated, in the manner already described, the shifting plate 41 is actuated to effect rotation of the pinion 52. At this stage of the operation, neither the pinion 82 nor the companion pinions 83 and 84 are in mesh with said pinion 52, so that the same is rotated without effecting actuation of any part. When, however, said plate 41 is about to be moved on its axis by the actuating element 97, the pinion-carrying plate 81, acting under the control of the cam-wheel 90, will have been moved on its axis 75 to position either the pinion 82 or the pinion 83 in mesh with the pinion 52, according to whether the structure has been set to effect computation by subtraction or by addition. Therefore, by the time the extension 98 of the actuating element 97 has reached a position to engage the roller-provided foot-extension 46 of the member 41, one or the other of said pinions 82 or 83 will be in mesh with the pinion 52, whereupon, during a continued movement of the element 97, said member 41 will be shifted in a direction opposite to that it followed when under the control of the selecting-lever 7; whereby, in the first place, said member 41 and the selecting-lever 7 will have been restored to normal position and, simultaneously therewith, the pinion 52 will have been rotated and, through either the pinion 82, or the companion pinions 83 and 84, effect a rotation of the gear 76 and, thereby, of the number-wheel 77. The degree of movement of the member 41, under the control of the selecting-lever 7—and this lever having been moved a predetermined distance, has determined whichever of the number-keys has been depressed by the operator—will have predetermined the extent of movement of the member 41 and, thus, of the pinion 52 and, as this predetermines the extent of rotation of the gear 76, the number-wheel 77 will have been rotated to position the number or index thereon corresponding with the number imprinted upon the work-sheet. In other words, if, as illustrated in Fig. 4, the number-key 9 has been depressed for actuating the plunger 6 to shift the selecting-lever 7 a distance equal to nine spaces, the member 41 will similarly have been moved so as to position the pinion 52 in order that it, through either the pinion 82, or the companion pinions 83 and 84, will rotate the gear 76 a distance equal to said nine spaces (as fixed by the teeth thereon), and thereby rotate the number-wheel so as to position it to exhibit the figure 9 through the opening 100 in the front plate 1$^b$ of the casing 1. If, however, the No. 5 numeral-key is the one which has been depressed, the selecting-lever 7 will have been moved a distance equal to five spaces, with a corresponding actuation of the parts between it and the number-wheel, so that said number-wheel will exhibit the figure 5. And so it will be in the instance of whichever number-key is depressed.

The driving-mechanism for the actuating instrumentalities 97 includes the pinions 95, the geared cam-disks 90, and the shaft 91. The latter extends through the casing 1 and carries on its outer end a pinion 102 (Fig. 1) with which meshes a large gear 103 supported on a stud 101 mounted on the outside of the casing of the computer, as shown. To this gear 103 is secured a four-tooth ratchet-wheel 104 adapted to be actuated by a spring-pressed pawl 105 carried by a circular disk 106. Said disk is provided on its lower periphery with gear teeth 107 adapted to mesh with a toothed arm 108 which is fulcrumed at 108$^a$ on the side of the casing 1 and to which is secured an operating hand-lever 109. The toothed arm is limited in its movement in one direction by a stop-stud 108$^b$ outstanding from the side of the casing as shown in Fig. 1$^a$, and this holds the other adjunctive parts against retrograde movement. To hold the parts against movement in the opposite direction, except as controlled by the lever 109, the pinion 102 is provided with an outstanding stud 102$^a$ which is adapted to engage against the periphery of a disk 110 secured to the disk 106. As seen in Fig. 1$^a$, this disk is provided with a clearance incut 111 in one portion of its periphery, and into this the stud 102$^a$ will (as the pinion 102 begins its rotative movement) travel and thereby permit said pinion to complete its rotation. When said pinion is inactive it will engage the shoulder 111$^a$ and prevent movement of the pinion. From this it will be understood that when the lever 109 is pulled forward by the operator, the arm 108 gives the toothed disk 106 a rotative movement and this, in turn, produces movement of the disk 106 which, then, actuates the pawl 105 against one or another of the teeth on the toothed wheel 104 and this communicates rotative movement to the gear 103 which, itself, then effects a rotation of the pinion 102, whereby the shaft 91 is rotated (always in the same direction), and makes a complete revolution each time that the hand-lever 109 is operated. It will therefore be understood that the handle, the disks 106 and 110, the toothed wheel 104, gear 103, pinion 102, shaft 91, etc., constitute a driving or actuating mechanism which I shall herein designate the "independent operating mechanism" consisting, in this instance, of the cammed members 97.

In Fig. 4, the member 41 is shown in the position it occupies after being actuated by the selecting-lever 7. In this instance, the companion members 83 and 84 have, by the movement of the pinion-carrying plate 81, been shifted into mesh with the pinion 52, and the shaft 91 and the disks 90 turned slightly, so that, if the operator were, at this stage, to pull the hand-lever 109 forward to rotate the shaft 91, the cammed extension on the member 97 would rock the member 41 upon its axis 42 and thereby restore it to normal position and simultaneously rotate the pinion 52, pinions 83 and 84, gear 76, and number-wheel 77, whereby the parts will then have become positioned as illustrated in Fig. 5, and, as the structure is set to effect computation by subtraction, in this instance, the said number-wheel 77 will have been rotated in a counterclockwise direction. Had the setting lever 64 been shifted to set the parts to effect computation by addition, the pinion 82 would have been positioned in mesh with the pinion 52 and effected a rotative movement of the number-wheel in a clockwise direction and thereby the parts would have been actuated to effect a computation by addition. If, on the other hand, the setting lever had been set to "non-producing" position, as already described, neither the pinion 82 nor the pinion 83 would have been positioned in mesh with the pinion 52. It follows, therefore, that the actuation of the hand-lever 109 to move the actuating element 97 would merely have caused the plate 41 to be returned to normal position and, in the course of its travel, would have rotated the pinion 52 without effecting the operation of either of the other pinions, for the reason that neither of these pinions would then be in mesh therewith. This "non-producing" feature of the machine is an important one because it enables the elements of the computer-component selecting-mechanism to be restored to normal or starting position—to correct a mistake or to enable a new series of figures to be imprinted—without at the same time producing a computation.

As it is essentially important that the pinion 52 shall always be in a predetermined position, to insure accuracy, preparatory to its being rotated by the shifting plate 41 when the latter is to act as an actuating connection between the actuating element 97 and said pinion 52, whereby the proper degree of rotation of the gear 76 and number-wheel 77 shall be accomplished, I have provided means for setting said pinion in proper operative position, and these means are controlled by instrumentalities carried by the actuating element 97, as now to be described: Mounted on the shaft 45, and interposed between and fastened to the pinions 44 and 52, is a star-wheel 112, the teeth or serrations of which bear a fixed relation to the respective teeth on the pinion 52. Arranged to engage in one or another of the serrations in said star-wheel 112 is a nose 113 formed on one arm 114 of a three-armed plate 115 loosely supported on the shaft 42, (Fig. 18), a second arm 116 of which plate carries a beak 117 which is adapted to travel on the cammed periphery 97$^a$ of the actuating element 97, and which periphery is provided with a raised portion 97$^b$. It is seen that, during the rotation of the member 97, the beak 117 will, for a part of the time, travel on the cammed periphery 97$^a$. When, however, it arrives at and is moved by the portion 97$^b$, the three-armed plate 115 is rocked on its axis 42 and causes the nose 113 to move toward one or another of the serrations in the star-wheel 112. The active edge of the nose 113 is so formed that it will tend to move the star-wheel 112 slightly on its axis, in the event that it is not in proper position, as the pointed portion 113$^a$ of the nose bottoms in the serration. Such movement of the star-wheel 112 will accurately position the pinion 52 (both the star-wheel and said pinions 44 and 52 being secured together) so that, when either the pinion 82 or pinion 83 is, by the pinion-carrying plate 81, moved into mesh with said pinion 52, such intermeshing will be effected according to the predetermined and necessary relation of the teeth of the pinion 52 to the teeth of the gear 76 whereby the number-wheel 77 shall be rotated the exact degree required to bring the proper numeral thereon opposite the opening 100 in the front plate 1$^b$ of the casing.

With a view to further controlling the star-wheel 112, a detent 118 is loosely supported on the cross-bar 51 and has its active end constantly in engagement with the teeth of the star-wheel. It is held in such engagement by a spring 119 secured to its end (opposite its fulcrum 51) and to the third arm 120 of the three-armed plate 115. It will be understood that a shifting movement of the plate 115 in the direction of the arrow (Fig. 18) will tend to tension the spring 119 and thereby cause the detent 118 to press more firmly against the teeth of the star-wheel 112 to hold the same in proper position after being positioned by the nose 113 of said three-armed plate 115. Said detent also tends to prevent any overthrow movement of said star-wheel and holds the parts which are secured to it up to the beginning of the rotation of the pinion 52 in either direction. Moreover, and a more important function, is its control of the pinion 52 during its rotation under the action of the shifting plate 41 when the latter is being moved by the selecting-lever 7. In this instance, the detent holds the star-wheel and, thus, the pinion, in the exact position to which they had been rotated by the movement of the shifting member 41.

In addition to the fixed limiting abutments or stops 48 and 51 (which are engaged respectively by the recessed portions 49 and 50 of the shifting plate 41) already described, I provide, also, additional means as a temporary stop or abutment for the shifting plate 41 and its adjunctive parts to overcome their movement when the pinion 82 or the pinion 83 are moving into engagement with the pinion 52. An adaptable form of such means is shown particularly in Figs. 18 and 19, and comprises a lever 121 loose on the shaft 42 and having a beak 122 adapted to traverse the peripheral portion 97$^c$ of the actuating element 97 and periodically engage an elongated raised portion 97$^d$. The lever 121 carries a stud 123 which is adapted to engage in a recess 124 formed in the right-hand edge of the shifting member 41. When the cammed portion 97$^d$ of the actuating element 97 engages the beak 122 of the lever 121, it rocks said lever 121 on its axis 42 and moves the stud 123 into the recess 124 and remains in that position while said beak 122 is riding upon the surface of the portion 97$^d$, whereby said shifting plate 41 is temporarily arrested in its travel as it approaches the fixed abutment 48, whereby said plate 41 and its adjunctive parts are prevented from overthrowing. The stud 123, therefore, becomes a shiftable abutment for the said shiftable member 41.

It is to be understood that the meshing of pinion 83 or of pinion 82 with the pinion 52 will cause said pinion 52 to be rotated slightly, which action will cause the shifting member 41 to be rocked away from the fixed abutment 48; whereupon, the temporary abutment 123 will move to a position at which it will arrest said member 41 slightly in advance of the fixed abutment. When the pinion 83 or the pinion 82 is being disengaged, the member 41 will move to a position against the fixed abutment 48. The slight rotation of the pinion 52, caused by the meshing and unmeshing of pinion 82 or the pinion 83, results from the fact that the main gear 76 remains stationary during such meshing and unmeshing.

Hereinabove, I have described the pinion-carrying plate 81 and the means for actuating the same to position the pinions which it carries into operative engagement with the pinion 52. To insure the proper retention of said pinion-carrying plate against shifting out of operative position, means are provided that are adapted to interengage with said pinion-carrying plate; and, in the present instance, this comprises a cammed control-lever 125 fulcrumed on a shaft 126 and controlled, in one direction of its movement, by a spring 127. Toward its free end it is provided with a roll-carrying stud 128 adapted to traverse the periphery of the cammed member 90 and, at a predetermined point in its cycle of rotation, ride into a cam-way 129. The extremity of the lever 125 is provided with a downwardly-extending lug 130 which normally stands in a position slightly above an upstanding lug or projection 131 formed on the pinion-carrying plate 81. The lug 130 is adapted to drop down beyond the plane of the upper end of the projection 131, as shown in Fig. 4, for instance, when the roller-carrying stud 81$^a$ is traversing the cammed surface 93. Similarly, when said roller-carrying stud 81$^a$ is traversing the cammed surface 94, the lug 130 will move off the upper end of the projection 131 and into the recess 132. When said lug 130 is in the recess 132, the pinion-carrying plate is prevented from shifting toward the left; and, similarly, when said lug 130 is on the opposite side of the projection 131, as shown in Fig. 4, the pinion-carrying plate is prevented from shifting toward the right. The spring 127 holds the lever 125 in operative engagement with the periphery of the member 90 and causes the lever to travel in the cam-way 129.

Zero producer.

To restore parts of the mechanisms in the machine, within the computer, whereby the number-wheels will all be returned to normal position, I have provided means to rotate the gear-wheels 76 and, thereby, the geared number-wheels 77; and, also, devices actuated by said means whereby adjunctive parts are rendered inoperative in order to permit the free rotation of the gear 76 and number-wheels 77. In this way, zeros are produced in the visual opening 100 in the casing, and this mechanism I have herein designated the zero producer. In the main, it comprises a plate 133 fast on the shaft 75 and occupying a position within the ratchet-wheel 79, as shown in Fig. 17. Pivoted on a projecting portion of the plate 133 is a latching detent 134 which is controlled by a spring 135 secured in the upper edge of the plate 133 and having its end 135$^a$ acting on an inwardly-projecting lug 134$^a$ on the detent 134 to force the latter away from the shaft 75. The detent, with the plate 133, is moved by the shaft 75 during its rotation and, in the course of its travel in a counter-clockwise direction, engages a fixed abutment 136, which determines its normal position and causes the spring 135 to be compressed. The ratchet-wheel 79, which is of ring form, is provided on its inner periphery with three teeth or abutments 137 which are designed to be engaged by the depending lug 134$^a$ on the detent 134 when it is operated. If the gear 76 is rotating in the direction indicated by the arrow, Fig. 17, the lug 134$^a$ on the detent will be held out of the path of travel of the teeth or abutments 137. If, however, it be then necessary to actuate the zero-producer, the rotation of the shaft 75, as by the zero-producer lever 138, causes the depending lug 134$^a$ to engage one or another of the teeth or abutments 137, whereby said ratchet-wheel 79 and gear 76 will be rotated until the lever 138 engages a stud 139 outstanding from the casing 1. The shaft 75 is provided with a cam-disk 75$^a$, fast to it. This cam-disk is designed to move with the shaft 75 when rocked by the zero-producer lever 138 to effect its engagement with an abutment portion 58$^b$ of the member 58 to rock the same on its axis 60 and thereby disengage the pawl 73 from the ratchet-ring 79 in order to permit its rotation in a clockwise direction. As the zero-producing movement is always in said clockwise direction, it is unnecessary ever to effect disengagement of the lower pawl 74, as it will ride over the teeth of the ratchet-ring, as is obvious.

Carrying mechanism.

Hereinbefore, I have described in part the mechanism which engages the ratchet-rings 79 whereby the direction of rotation thereof and of the gear 76 is determined. These same instrumentalities, comprising the shiftable pawl-carrying plates 70 with the pawls 73 and 74 carried thereby constitute in part the carrying-mechanism whereby the carrying from one series onto the next adjacent series is effected. To effect rotation of the ratchet-wheel or rings 79, when carrying is to be effected, means are provided, and these are controlled by instrumentalities carried by the several gears and having a predetermined relation to the numerals on the number-wheels 77 whereby, as the same are rotated beyond the ninth digit, a carrying onto the next adjacent set of instrumentalities is effected. These instrumentalities comprise the toothed disk 80 which is secured on the side of the gear 76 opposite to the ratchet-ring 79, as shown in Fig. 14, and which disks are provided with tripping teeth or projections 80ª, there being preferably three of these, as shown particularly in Figs. 13 and 15, and which are adapted to be engaged by a detent 141 fulcrumed intermediate of its ends and having a hooked end 142, the purpose of which will presently be explained.

Pivoted on the outer end of said plate 70 is a plate-actuating lever 143 fulcrumed intermediate of its ends on the shaft 126 and provided, at its upper end, with a hook-like portion 144 which is adapted to engage the hooked end 142 of the detent 141. The lever 143 carries at its lower end, below its fulcrum 126, a roller 145 which is adapted to be engaged and moved by a cammed lug 146 formed on the outer periphery of the cam-member 90. It will now be understood that, when said cammed member 90 is rotated it will, in the course of such movement, present the cam lug 146 in engagement with the roller 145 on the lever 143 (which, it may here be incidentally stated, is controlled by a spring 147) whenever said roller-provided lever is in the path of travel of said cammed projection, and will rock the lever upon its axis 126 and effect an inward thrust of the pawl-carrying plate 70, whereby one or the other of the pawls 73 and 74 will be caused to move the ratchet-ring 79 the distance of one tooth, the elongated slot 71 permitting the shifting movement of the pawl-carrying plate 70, as described. The direction of rotation of the ratchet-ring 79 and, thus, of the gear 76, will depend upon which of the pawls 73 and 74 is in engagement with the ratchet-ring 79, and, as already described, the alternate positioning of these pawls 73 and 74 is determined by the plates 58 and 59, and these, in turn, depend for their movement and position upon the cam-disks 57 which are under the control of the oscillating plates 53, these latter being positioned by the setting lever 64, all as hereinbefore fully described.

The position of the lever 143—in or out of the path of travel of the cam-lug 146—is controlled by the following instrumentalities: The toothed disks 80, secured to the gear 76, will, during their rotation, present one or another of the teeth 80ª to the detent 141 and actuate the same on its axis, whereby the lever 143 will be released from its interlocking engagement with said detent 141 and, under the influence of the spring 147, be rocked backwardly on its axis 126, thereby moving the lower roller-carrying end 145 into the path of travel of the cammed lug 146 which thereupon rocks said lever 143 on its axis and, as already described, shifts the plate 70 to cause one or another of the pawls thereon to rotate the ratchet-ring 79 one tooth. It will be seen that when said cam-lug 146 disengages from the roller-carrying end of the lever 143 the upper hook-formed end 142 will again interlock with the detent 141, the toothed disk 80 having been rotated to carry the tooth which has been active to actuate the detent 141, out of actuating position.

It will be understood that there is one less of these carrying mechanisms than the number of series of number-wheel actuating-mechanisms, because the last of the series does not require carrying instrumentalities. Each of the toothed disks 80 constitutes the active instrumentality and connection between each of the series of number-wheel actuating-mechanisms, and by these means, the carrying from one series to another is effected, as required by the computation. The actuation of the several carrying mechanisms is precisely the same, except as regards the direction of rotation of the number-wheels, the gear 76, ratchet-rings 79 and toothed disks 80, whether the parts are set to effect a computation by addition, or a computation by subtraction.

I have hereinbefore described various forms of devices which are employed in conjunction with certain of the mechanisms to control their operation and prevent excessive or overthrow movements thereof. In connection with the gear 76, I have also provided means for performing the same functions: In this instance, a detent 148 is fulcrumed on a shaft 149, and carries, at one side of its fulcrum, a retractile spring 149ª having one of its ends secured to said detent and its other end secured at the point marked 149ᵇ. Said detent carries at its opposite end a roller 150 which is designed to have a yielding engagement with the teeth of the ratchet-ring 79.

I have already described herein one form of means for restoring the levers 7 to normal or starting position, and which depends for its operation upon the hand-lever 109 and the parts actuated thereby. In lieu of operating this means, I may operate another and somewhat simpler form of structure, the same comprising a two-armed pendant member 151, Figs. 1 and 6, having a cross-piece 152 and pivoted at 153 (Fig. 1) at the back of the casing 1. This member is free to swing on its fulcrum, and the cross-piece 152 is in a position to engage the rear ends of the levers 7 and reshift them to normal position. When this other form of mechanism is utilized, I prefer to construct the cam-disk 90 in the form shown in Fig. 6ª. In this instance, a block 154 is disposed in the enlarged portion of the cam-groove, so that there will be no neutral position of the pinion-carrying plate 81. This will insure a more positive meshing of the pinion 82 and 83 with pinion 52, and dispense with the lever 125 and recess 129 in the cam-disk 90. Moreover, by reason of the fact that the stud 81ª will abut against said block (when the setting lever 64 is in the central position), it and the parts by which it is controlled will be positively prevented from being actuated until said lever is shifted to add or subtract.

The device for restoring the computer-component selecting-mechanism, as already described, is adapted to effect a reshifting or resetting of a plurality of the selecting-levers 7. I have, however, devised a device for resetting a single lever; and a form of this is illustrated in Fig. 20. It comprises a lever 155, fulcrumed on a shaft 156 disposed at the back of the casing 1. This lever 155 is shiftable on the shaft in order to aline it with any of the selecting-levers 7, and is adapted to be rocked, when so positioned, to engage the rear end of the selecting-lever with which it has been alined. Thereby, said lever is pushed forward and, thus, the various elements of the selecting-mechanism housed within the casing are returned to normal position. The upper end of said restoring-lever carries a pointer 157 (Fig. 20) juxtaposed to an indicator or scale-element, (not shown), whereby the alining of the restoring-lever with the desired selecting-lever is facilitated.

As shown in Fig. 20, the casing 1 is supported on the line-spacing-carriage by means of bars 2 and 3. I prefer to mount the casing in order that it may be shifted longitudinally thereon. In order to retain it in any of its shifted positions, I provide a locking-device, which, in this instance, is a latch 161, adapted to engage in serrations 159ª in the bar 3.

As shown in Fig. 1, I have provided means for preventing the letter-spacing carriage (on which is supported the carriage-component selecting-mechanism) from being returned past the computer-casing until after the actuating-handle 109 shall have been operated, or until the device for resetting the selecting-mechanism, as already described, has been operated to restore said selecting-mechanism to normal position. This means comprises, in this instance, a two-armed member 162 pivoted on the side of the casing and carrying an angulated extension 162ª which extends beneath the several selecting-levers 7. The upper arm 162ᵇ of said member overlies the rear edge of the top-plate of the letter-space carriage, and upon which is mounted a stop 163. The end of the arm 162ᵇ normally lies in a plane just above the aforementioned stop and is held in this position against jarring by a friction or detent spring 164, Fig. 1. The lower or angulated arm 162ª lies in a serration or notch 165 in the oscillating member 30, Fig. 4, already described, and is adapted to be actuated by the camming action which takes place between one face of this serration and the angulated portion of lever 162. It will be readily seen that, when the plunger 6 of the carriage mechanism is alined with any of the selecting-levers 7, and if one of the numeral keys is depressed or actuated, that the cammed face of said serration will act upon the member 162 to rock it upon its fulcrum 166, and, thus, cause the arm 162ᵇ to be positioned in the path of travel of the stop 163. Any attempt to return the letter-spacing carriage at this stage will result in the stop 163 abutting against the arm 162ᵇ of the member 162. This will prevent the carriage from being returned until certain other instrumentalities, now to be explained, are actuated to coact with the member 162, and this will return it to its normal position, whereby it will again be positioned in a plane slightly above the stop 163, thus permitting the carriage to be returned to starting position. The aforementioned instrumentalities comprise, in the one instance, a pin 167 projecting from the member 162 and in a position to be acted upon by a projection 168 on the lower end of the lever 109.

In another form of this structure (as shown in Fig. 1), I provide a projection 169 on the depending lever 151 which will coact with the member 162 to rock it on its fulcrum in the same manner and for the purpose already explained.

From the foregoing, it is to be recognized that the distinguishing features between my aforementioned patented construction and the present invention are, first, the inclusion of mechanism adapted to be set to effect computation by subtraction; and, secondly, controllable means for setting the mechanisms to effect the computation by subtraction additional to the mechanism adapted to be set to effect computation by addition. In the preferred embodiment of my invention, the controllable setting means comprises a single mechanism, whereby each and all are set, as may be desired, first, to effect computation by addition; and, secondly, to effect computation by subtraction. Moreover, these parts may, if desired, be set so that non-production of a computation is rendered possible.

While I have herein described my invention with considerable detail, and specified the preferred forms of the parts and the relative arrangement and coaction between the same, etc., it is nevertheless to be understood that I have attempted herein merely to exemplify one of several embodiments of my invention, and therefore do not limit myself thereto.

Having thus described my invention, what I claim is:

1. The combination with a typewriter and the printing-keys thereof, of a computing attachment including selecting means operated by the keys, instrumentalities carried by the attachment and operable in one direction for effecting additive computation and, in a different direction, for effecting subtractive computation, setting means operable after as well as before the actuation of the selecting means by the keys for setting said computation instrumentalities to produce additive or subtractive computation, and means separate from the keys for acting on the computation instrumentalities to produce the computation.

2. The combination with a typewriter and the printing-keys thereof, of a computing attachment including selecting means operated by the keys, instrumentalities carried by the attachment and operable in one direction for effecting additive computation and, in a different direction, for effecting subtractive computation, a single setting means operable after as well as before the actuation of the selecting means by the keys for setting said computation instrumentalities to produce additive or subtractive computation, and means separate from the keys for acting on the computation instrumentalities to produce the computation.

3. A computing machine including in combination, key-operated selecting means, instrumentalities operable in one direction for effecting computation by addition and, in a reverse direction, for effecting computation by subtraction, setting means shiftable into a plurality of positions to predetermine the character of computation, connections between said selecting means and said instrumentalities and adapted to be actuated when said setting means is shifted into one or another of its plurality of positions, and means under the control of the operator and acting on said selecting means and causing actuation thereof to operate said connections, whereby said instrumentalities are caused to effect computation by addition or by subtraction according to the predetermined position of said setting means.

4. A computing machine including in combination, key-operated selecting means, instrumentalities operable in one direction for effecting computation by addition and in a reverse direction for effecting computation by subtraction, a shiftable connecting-device interposed between the computation-instrumentalities and the selecting means, setting means shiftable into a plurality of positions for predetermining the direction in which the connecting-device shall be moved and, thus, determining the direction in which the computation-instrumentalities will be operated, and means under control of the operator and operable to shift the connecting-device in a direction predetermined by the setting-means and acting on said selecting-means to effect operation of the computation instrumentalities.

5. A computing machine including in combination, key-operated selecting means, instrumentalities operable in one direction for effecting computation by addition and, in a reverse direction, for effecting computation by subtraction, setting means shiftable into a plurality of positions to predetermine the character of computation, connections between said selecting means and said instrumentalities and adapted to be actuated when said setting means is shifted into one or another of its plurality of positions, and means under the control of the operator and acting directly on said selecting means and causing actuation thereof to operate said connections, whereby said instrumentalities are caused to effect computation by addition or by subtraction according to the predetermined positioning of said setting means, said independently controllable means also acting on said selecting means simultaneously to restore the same to normal position.

6. A typewriter-operated computing machine including in combination, typewriter-keys, selecting means operable thereby, instrumentalities operable in one direction for effecting computation by addition and in an opposite direction for effecting computation by subtraction arranged in juxtaposition to said selecting means, setting means therefor, and operating mechanism normally inactive when motion of the selecting-means is initiated but, when moved, operating directly into engagement with and on said selecting-means to actuate said instrumentalities in one direction to produce additive computation and in another direction to produce subtractive computation.

7. A typewriter-operated computing machine including in combination, typewriter-keys, selecting means operable thereby, instrumentalities operable in one direction for effecting computation by addition and in an opposite direction for effecting computation by subtraction arranged in juxtaposition to said selecting means, setting means therefor, adapted to be operated either before or after actuation of the selecting means, and operating mechanism normally out of engagement with said selecting-means and inactive when motion of the selecting-means is initiated but, when moved, operating directly into engagement with and on said selecting-means to actuate said instrumentalities in one direction to produce additive computation and in another direction to produce subtractive computation.

8. The combination in an adding and subtracting attachment including denominational wheels, of gears for turning the same in opposite directions, instrumentalities for operating said gears, key-operated devices for positioning said gear-operated instrumentalities to effect a selection only, and separate means for actuating the same to effect a computation.

9. The combination of an adding and subtracting attachment including denominational-wheels, gears for turning the same in opposite directions, instrumentalities for operating said gears, levers for positioning said gear-operating instrumentalities to effect a selection only, and separate means for actuating the same to effect a computation.

10. The combination with operating-keys, of an adding and subtracting attachment controlled by said keys, and including a denominational-wheel, a gear for turning the same in opposite directions, a ratchet-wheel carried by said gear, a pawl-carrying device operatively positioned relative to the ratchet-wheel, means for moving the pawl-carrying device backward relative to the ratchet, and independent means for moving the pawl-carrying device forward to turn the gear.

11. The combination with operating-keys, of an adding and subtracting attachment controlled by said keys and including a denominational-wheel, a gear for turning the same in opposite directions, a ratchet wheel carried by said gear, a pawl-carrier operatively positioned relative to the gear, means for positioning said pawl-carrier, and separate means for moving said pawl-carrier forward to turn the gear.

12. The combination with operating-keys, of an adding and subtracting attachment controlled by said keys and including a denominational wheel, a gear for turning the same in opposite directions, ratchet teeth on said gear, a pawl-carrier positioned adjacent the ratchet teeth, means for moving said pawl carrier, and separate means for setting said pawl carrier.

13. The combination with operating-keys, of an adding and subtracting attachment controlled by said keys and including a denominational wheel, a gear for turning the same in opposite directions, ratchet teeth on said gear, a pawl-carrier positioned adjacent said ratchet-teeth, and a lever adapted to move the pawl-carrier in opposite directions.

14. The combination in an adding and subtracting attachment including a number wheel, of a gear engaging said number-wheel for turning the same in opposite directions, ratchet-teeth on said gear, a pawl-carrier positioned adjacent the ratchet teeth, and means for moving the pawl-carrier including a revoluble cam.

15. The combination with operating-keys, of an adding and subtracting attachment controlled by said keys and including a number wheel, a gear engaging said number wheel for turning the same in opposite directions alternately, ratchet teeth on said gear, a pawl-carrier positioned adjacent the ratchet teeth, means for actuating said pawl-carrier, including a manually-controlled cam.

16. The combination with operating-keys, of an adding and subtracting attachment controlled by said keys and including a plurality of number-wheels and gears engaging said number-wheels for turning the same in opposite directions, pawl-carriers positioned adjacent said gears, means for adjusting the pawl-carriers including a series of cams for turning said pawl-carriers, the engaging portions of said cams being arranged spirally to cause them to move the pawl carriers successively.

17. The combination with operating-keys, of an adding and subtracting attachment including a series of number wheels and gears engaging said number wheels for turning the same in opposite directions alternately, and successively-operated means including a revoluble cam-device for turning each gear one increment after the next adjacent gear on the right has moved its denominational-wheel to zero or farther.

18. The combination with operating-keys, of an adding and subtracting attachment including a series of number-wheels and gears engaging said number-wheels for turning the same, in opposite directions alternately, a plurality of spaced projections carried by each gear, and instrumentalities including a revoluble cam-device controlled by said projections and positioned to move each gear one increment after the next adjacent gear on the right has moved its denominational-wheel to zero or farther.

19. The combination with operating-keys, of an adding and subtracting attachment controlled by said keys and including two adjacent denominational-wheels and gears for turning the same in opposite directions alternately, ratchet-teeth on said gears, pawls engaging said ratchet-teeth on the gear of higher denomination, a member carrying said pawls, and means including a revoluble cam-device for moving said member to cause one or the other of the pawls to move the ratchet-teeth a distance of one tooth after the other gear has turned its denominational-wheel to zero or farther.

20. The combination with operating-keys, of an adding and subtracting attachment controlled by said keys and including a denominational wheel and a gear for turning the same in opposite directions alternately, means independent of the operating-keys and including a cam-device for turning said gear, and means for preventing excessive movement thereof.

21. The combination with operating-keys, of an adding and subtracting attachment controlled by said keys and including a series of denominational-wheels, a series of gears for turning the denominational-wheels in opposite directions alternately, first for additive computation and, then for subtractive computation, and means independent of the operating keys for moving all of said gears to produce a computation.

22. The combination with operating-keys of an adding and subtracting attachment controlled by said keys and including a series of denominational-wheels, a series of gears for turning the denominational-wheels in opposite directions alternately, means independent of the operating-keys and including a cam-device for moving all of said gears to produce a computation, and setting means for predetermining the character of the computation.

23. The combination with operating-keys of an adding and subtracting attachment controlled by said keys and including a series of denominational-wheels, a series of gears for turning the denominational-wheels in opposite directions alternately, means independent of the operating-keys and including a cam-device for moving all of said gears to produce a computation, and setting means for predetermining the character of the computation before said gears operate to turn the denominational-wheels.

24. The combination in an adding and subtracting attachment, of zero-producing instrumentalities including a denominational-wheel, a gear for turning the same in opposite directions, a shaft upon which the gear is loosely mounted, ratchet-teeth on the gear, an arm fast on the shaft, a detent fulcrumed on the arm, a spring between the arm and the detent and operable to move the detent into engagement with the teeth when the shaft is rotated in one direction, and means engageable by the pawl for disengaging it from said teeth when the shaft is rotated in the opposite direction.

25. The combination with operating-keys of an adding and subtracting attachment controlled by said keys and including a denominational wheel, a gear for turning the same in opposite directions alternately, means independent of the operating-keys for operating said gear, and zero-positioning devices arranged to act upon said gear.

26. The combination with operating-keys of an adding and subtracting attachment controlled by said keys and including a denominational wheel, a gear for turning the same in opposite directions alternately, means independent of the operating-keys for operating said gears, zero-positioning devices arranged to act upon said gear, and devices for disconnecting the actuating means during the operation of the zero-positioning devices.

27. The combination with operating-keys of an adding and subtracting attachment including denominational wheels, gears for turning the same in opposite directions, instrumentalities for operating said gears, devices under the control of the operating-keys for positioning said gear-operating instrumentalities to effect a selection only, setting means acting to predetermine the character of computation to be effected by said denominational wheels, and separate means for actuating the instrumentalities to effect a computation.

28. A calculating device including in combination key-operated selecting means, mechanism operable for effecting an additive and subtractive computation, means for setting said mechanism to effect one or the other of said forms of computation, and means under the control of the operator and normally unconnected but actuatable into active engagement with said key-operated selecting means for acting on said mechanism to produce a computation.

29. A calculating device including in combination key-operated selecting means, instrumentalities operable in one direction for effecting additive computation and, in a reverse direction, for effecting subtractive computation, setting means shiftable into any of a plurality of positions to determine the character of computation, connections between said selecting means and said instrumentalities and adapted to be actuated when said setting means is shifted into one or another of its plurality of positions, means under the control of the operator and operative independently of the selecting means keys and acting on said selecting means to actuate said instrumentalities to effect additive or subtractive computation as predetermined by the position of said setting means, said independently controllable means also acting on said selecting means to simultaneously restore the same to normal position, and carrying mechanism controlled by said computation-instrumentalities and actuated during the operation of said operator-controlled means.

30. A computing attachment including selecting means, keys for actuating said means, mechanism operable for effecting a computation by addition or by subtraction, means for setting said mechanism to effect one or the other of said forms of computation, and means including an actuating handle movable in one direction under the control of the operator to act on said computing mechanism to produce additive or subtractive computation or no computation according to the position of said setting mechanism.

31. A computing attachment including selecting means, keys for actuating said means, mechanism operable for effecting a computation by addition or by subtraction, means for setting said mechanism to effect one or the other of said forms of computation, and means including a cam disk and cammed arms movable in one direction under the control of the operator to act on said computing mechanism to produce additive or subtractive computation or no computation according to the position of said setting mechanism.

32. A computing attachment including selecting means, keys for actuating said means, instrumentalities operable in one direction for effecting computation by addition and, in a reverse direction for effecting computation by subtraction, a setting means movable into a plurality of operating positions, either before or after said selecting means are operated by said keys, to position said instrumentalities to effect computation either by addition or by subtraction, and means under the control of the operator and operative independently of the keys and acting on said instrumentalities for producing the computation.

33. A calculating device including in combination, key-operated selecting means, instrumentalities operable in one direction for effecting additive computation and, in a reverse direction for effecting subtractive computation, setting means shiftable by a single movement into any of a plurality of positions to predetermine the character of computation, connections between said selecting means and said instrumentalities and adapted to be actuated when said setting means is shifted into one or another of its plurality of positions, and means under the control of the operator and operative independently of the selecting means keys and acting on said selecting means to actuate said instrumentalities to effect additive or subtractive computation as predetermined by the position of said setting means.

34. A computing attachment including selecting means, keys for actuating said means, instrumentalities operable in one direction for effecting computation by addition and, in a reverse direction, for effecting computation by subtraction, a setting means movable into a plurality of operating positions to position said instrumentalities to effect computation either by addition or by subtraction, means under the control of the operator and operative independently of the keys and acting on said instrumentalities for producing the computation, and means for returning said selecting means to normal position independently of the operation and position of said setting means and said computation means.

35. In a computing machine, setting means shiftable into any of a plurality of positions, a lever associated therewith and provided with projections for shifting said means from one position to another, means for automatically unlocking and locking said lever when pulled or pushed from one position to another and comprising a guiding element for said lever and provided with a notch into which the projections on said lever may enter to lock the lever and setting means in the position to which they may have been moved.

36. A calculating device including in combination, key-operated selecting means, instrumentalities operable in one direction for effecting additive computation and, in a reverse direction, for effecting subtractive computation, setting means shiftable into any of a plurality of positions to predetermine the character of computation, connections between said selecting-means and said instrumentalities and adapted to be actuated when said setting means is shifted into one or another of its plurality of positions, means including an actuating handle under the control of the operator and operative independently of the selecting-means-keys and acting on said selecting means to actuate said instrumentalities to effect additive or subtractive computation as predetermined by the position of said setting means, and means for limiting the extent of movement of said operator-controlled means.

37. In a computing attachment, setting means including a setting lever movable into any of a plurality of operative positions, a shiftable member to which the lever is connected, and means for automatically locking said shiftable member in position and from which position it is released by a pull or push on the lever, said means comprising a guiding element with which the lever is engaged by an oscillating movement of the lever independent of the member.

38. The combination of key-operated selecting means, instrumentalities operable in one direction for effecting additive computation and, in a reverse direction, for effecting subtractive computation, setting means shiftable into any one of a plurality of positions to predetermine the character of computation, connections between said selecting means and said instrumentalities and adapted to be actuated when said setting means is shifted into one or another of its plurality of positions, and means under the control of the operator and independent of the selecting-means and acting thereon to return said means to normal position while the computation-producing mechanism remains inactive.

39. In an adding and subtracting machine, instrumentalities for producing additive and subtractive computation, a gear-support coöperating therewith and provided on one side with a large gear and on the opposite side with a pair of relatively small gears, an interposed gear between the large and small gears and disengaged therefrom, a segment-gear for effecting rotative movement of said interposed gear independent of said large and small gears, means for positioning said large and small gears alternately in mesh with said interposed gear whereby the large gear or the small gears may receive rotative movement from said interposed gear when the segment effects its rotation, and means including a rotatable cam for actuating the segment-gear.

40. The combination with a series of operating-keys, of a computing-attachment including selecting-means actuated by said keys in one direction; instrumentalities operable in one direction for effecting computation by addition and, in a different direction, for effecting computation by subtraction; setting-means for said instrumentalities; and means under the control of the operator, operative independently of the keys, and acting on said selecting-means to move the same in a direction opposite to that when moved by said keys, to produce either additive or subtractive computation.

41. The combination of operating-keys; selecting-means in a computing-machine adapted to be operated in one direction only by said keys to represent an amount; means adjacent said selecting-means, normally disconnected therefrom, and having movement in two directions to connect the same with the selecting-means; setting-means under the control of the operator for predetermining the direction in which said means shall move and operating also to prevent movement thereof; means connected to the normally-disconnected means and operable in one direction to effect an additive computation and in an opposite direction to effect a subtractive computation according to the direction in which said setting-means moves said normally-disconnected means; and means independent of the operating-keys for causing movement of said computation-effecting means and, also, return movement of said selecting-means, whereby additive or subtrative computation is produced; said selecting-means being returnable independent of said computation-effecting means when movement of the normally disconnected means is prevented by the setting-means.

42. The combination with operating-keys, of a computing-attachment including selecting-means, computation-instrumentalities operable in one direction for effecting additive computation and, in a reverse direction, for effecting subtractive computation, a connecting-device interposed between said selecting-means and said instrumentalities and normally in engagement with said instrumentalities, and shiftable in relation to said selecting-means, setting-means under the control of the operator and acting on said connecting-device to position the same into and out of engagement with said selecting-means, and means under the control of the operator and movable to act on said selecting-means to actuate said computation-instrumentalities.

43. The combination with a computing-attachment including selecting-means, instrumentalities operable in one direction for effecting computation by addition and, in a reverse direction, for effecting computation by subtraction, setting-means shiftable into a plurality of positions to predetermine the character of computation, connections between said selecting-means and said instrumentalities and adapted to be actuated when said setting-means is shifted into one or another of its plurality of positions, and actuating-means acting directly on said selecting-means and causing actuation thereof to operate said connections whereby said instrumentalities are caused to effect computation by addition or by subtraction according to the predetermined positioning of said setting-means, said actuating-means also acting on said selecting-means simultaneously to restore the same to normal position.

44. The combination with operating-keys and a computing-attachment including selecting-means operated by said keys, instrumentalities operable in one direction for effecting computation by addition and, in a reverse direction, for effecting computation by subtraction, setting-means shiftable into a plurality of positions to predetermine the character of computation, connections between said selecting-means and said instrumentalities and adapted to be actuated when said setting-means is shifted into one or another of its plurality of positions, actuating-means acting directly on said selecting-means and causing actuation thereof to operate said connections, whereby said instrumentalities are caused to effect computation by addition or by subtraction according to the predetermined positioning of said setting-means, and carrying-mechanism controlled by said computation-instrumentalities and actuated during the operation of said actuating-means.

45. A calculating-device including in combination, key-operated selecting-means, mechanism operable for effecting an additive and subtractive computation, means for setting said mechanism to effect one or the other of said forms of computation, means under the control of the operator and normally inactive during the initial actuation of said key-operated selecting-means but adapted in coöperation therewith to act on said mechanism to produce a computation, and carrying-mechanism acting under control of said computation-mechanism.

46. A calculating-device including in combination, key-operated selecting-means mechanism operable for effecting an additive and subtractive computation, means for setting said mechanism to effect one or the other of said forms of computation, means under the control of the operator and normally inactive during the initial actuation of said key-operated selecting-means but adapted in coöperation therewith to act on said mechanism to produce a computation, and carrying-mechanism acting under control of said computation-mechanism and actuated by said operator-controlled means.

47. A calculating-device including in combination, key-operated selecting-means, mechanism operable for effecting an additive and subtractive computation, means for setting said mechanism to effect one or the other of said forms of computation, means under the control of the operator and normally inactive during the initial actuation of said key-operated selecting-means but adapted in coöperation therewith to act on said mechanism to produce a computation, and a controlling-device coöperating with the selecting-means for preventing a second operation thereof until after the operator-controlled means has been operated.

48. A calculating-device including in combination, key-operated selecting-means, mechanism operable for effecting an additive and subtractive computation, means for setting said mechanism to effect one or the other of said forms of computation, means under the control of the operator and separate from said key-operated selecting-means for acting on said mechanism to produce a computation, and a controlling-device coöperating with the selecting-means for preventing operation thereof after the same has been returned to normal position.

49. A calculating-device including in combination, key-operated selecting-means, mechanism operable for effecting an additive and subtractive computation, means for setting said mechanism to effect one or the other of said forms of computation, means under the control of the operator and separate from said key-operated selecting-means for acting on said mechanism to produce a computation, and a correcting-device coöperating with the selecting-means to restore the same to normal position and adapted to prevent a second operation of such selecting-means until after the correcting-device has been operated.

50. A computer including key-operated selecting-means, a carriage on which said selecting-mechanism is in part supported, and a device acting under the influence of said selecting-means for preventing retrograde movement of its carriage.

51. A computer including key-operated selecting-means, a carriage on which said selecting-mechanism is in part supported, and a device normally inactive but actuatable by said selecting means for preventing retrograde movement of the carriage until after the selecting-means has been returned to normal position.

52. A computer including key-operated selecting-means, a carriage on which said selecting-mechanism is in part supported, computation-producing mechanism, actuating-instrumentalities therefor, and means normally inactive but actuatable by said selecting means for preventing retrograde movement of the carriage until after the selecting means has been returned to normal position.

53. A computing attachment including selecting means, mechanism for effecting computations by addition and by subtraction, means for setting said mechanism to effect one or the other of said forms of computation, said setting means having a shifting movement in relation to said selecting means and also rotative movement, and means including an actuating device movable in one direction under the control of the operator to connect said setting and selecting means and produce by said rotative movement additive or subtractive computation.

54. A computing attachment including selecting means, mechanism for effecting computations by addition and by subtraction, means for setting said mechanism to effect one or the other of said forms of computation, said setting means having a shifting movement in relation to said selecting means and also rotative movement, and means including an actuating device movable in one direction under the control of the operator to effect a shifting movement of said setting means and also a rotative movement thereof to produce additive or subtractive computation.

55. The combination with a typewriter and the printing-keys thereof, of a computing attachment operable to produce additive and subtractive computations, selecting means operated by the printing-keys in one direction only for both additive and subtractive computations, means carried by the computing-attachment for causing actuation of the selecting-means in the opposite direction to produce additive or subtractive computation, and means operated by the selecting-means in one direction for producing additive computation and in an opposite direction for producing subtractive computation.

56. The combination in a typewriter of a support, a letter-space carriage including operating-keys shiftably supported by said support, a calculating-attachment mounted on said support and including selecting-means adapted to be actuated by said operating-keys when said carriage is shifted past the calculating-attachment in one direction, means carried by the calculating-attachment for holding the carriage from being returned past the calculating-attachment until the selecting-means is restored to normal position, and means carried by the calculating-attachment for returning the selecting-means to normal position.

57. The combination in a computing machine of key-operated selecting-means operable in one direction only by said keys to make a selection, computation-producing mechanism actuatable thereby, an operating handle for moving said selecting-means in the opposite direction and actuating said computation-producing mechanism to effect computation, and means independent of the operating handle for moving the selecting-means in a direction opposite to that when moved by the keys to destroy said selection while the computation-producing mechanism remains inactive.

58. A computing-attachment including selecting-means, keys for actuating said means, mechanism operable for effecting a computation by addition or by subtraction by being oppositely rotated, means for setting said mechanism to effect one or the other of said forms of computation, means adjacent said oppositely rotating mechanism for causing one increment of movement to be added thereto when an additive computation is performed and causing one increment of movement to be subtracted from said mechanism when subtractive computation is performed, the direction of movement of said mechanism being controlled by said setting-means.

59. The combination in a calculating-attachment of key-operated selecting-means actuatable in one direction by said keys, computation-instrumentalities rotatable by the selecting-means when said means is moved in the opposite direction, means independent of the keys for moving said selecting-means in the opposite direction to effect movement of said computation-instrumentalities either in one direction or another, setting-means including shifting arms, and carrying means including adding and subtracting pawls adapted to be connected to and disconnected from said computation-instrumentalities by said shifting arms when shifted by said setting-means.

60. The combination in an adding and subtracting machine, of a denominational-wheel, a main gear for turning the same in opposite directions, a shaft upon which said gear is loosely mounted, a plate loosely mounted on said shaft adjacent said main gear, an adding-gear and two subtracting-gears on said plate and constantly in mesh with said main gear, key-operated selecting-means interposed between the adding-gear and the subtracting-gears and adapted to be operated in one direction by said keys, setting-means adapted to shift either the adding-gear or the subtracting-gears into mesh with the selecting means, cams for holding the same against engagement until operated, and means under the control of the operator for operating the cams to effect engagement of either the adding-gear or the subtracting-gears with the selecting-means and for moving the selecting-means in a direction opposite to that in which it moves when moved by the keys for causing said selecting-means to revolve the gears and cause either an additive or a subtractive computation.

In testimony whereof I affix my signature in presence of two witnesses.

EDWARD C. WALTER.

Witnesses:
ADAM THOMPSON,
H. W. AMBROSE.

Copies of this patent may be obtained for five cents each, by addressing the "Commissioner of Patents, Washington, D. C."